US011478819B2

(12) United States Patent
Samad

(10) Patent No.: US 11,478,819 B2
(45) Date of Patent: Oct. 25, 2022

(54) METHOD FOR FORMING A POLYETHYLENE ALUMINA NANOCOMPOSITE COATING

(71) Applicant: King Fahd University of Petroleum and Minerals, Dhahran (SA)

(72) Inventor: Mohammed Abdul Samad, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/530,313

(22) Filed: Aug. 2, 2019

(65) Prior Publication Data

US 2021/0031231 A1 Feb. 4, 2021

(51) Int. Cl.
| | |
|---|---|
| C09D 7/61 | (2018.01) |
| C09D 123/06 | (2006.01) |
| C09D 7/40 | (2018.01) |
| C09D 5/03 | (2006.01) |
| C08K 3/22 | (2006.01) |
| B05D 1/00 | (2006.01) |
| B05D 3/14 | (2006.01) |
| B05D 3/02 | (2006.01) |

(52) U.S. Cl.
CPC ............ B05D 1/007 (2013.01); B05D 3/0218 (2013.01); B05D 3/142 (2013.01); C09D 5/031 (2013.01); C09D 7/61 (2018.01); C09D 7/67 (2018.01); C09D 123/06 (2013.01); B05D 2202/15 (2013.01); B05D 2401/32 (2013.01); B05D 2507/01 (2013.01); C08K 3/22 (2013.01); C08K 2003/2227 (2013.01)

(58) Field of Classification Search
CPC .................................................. C09D 123/66
See application file for complete search history.

(56) References Cited

U.S. PATENT DOCUMENTS

| | | | |
|---|---|---|---|
| 5,352,732 A | 10/1994 | Howard | |
| 2009/0306781 A1* | 12/2009 | Kyomoto | A61L 27/50 623/18.11 |
| 2011/0165435 A1* | 7/2011 | Rost | C23C 14/20 428/634 |
| 2017/0058431 A1 | 3/2017 | Shen et al. | |

FOREIGN PATENT DOCUMENTS

| CN | 100335550 C | 9/2007 |
|---|---|---|
| KR | 10-0590136 | 6/2006 |

OTHER PUBLICATIONS

Azam et al., "Tribological Evaluation of a UHMWPE Hybrid Nanocomposite Coating Reinforced With Nanoclay," May 2018, Journal of Tribology, vol. 140, p. 051304. (Year: 2018).*

(Continued)

*Primary Examiner* — Robert A Vetere
(74) *Attorney, Agent, or Firm* — Oblon, McClelland, Maier & Neustadt, L.L.P.

(57) ABSTRACT

A method for forming a polyethylene and alumina nanocomposite coating on a substrate is described. The method may use microparticles of UHMWPE with nanoparticles of alumina to form a powder mixture, which is then applied to a heated steel substrate to form the nanocomposite coating. The nanocomposite coating may have a Vickers hardness of 10.5-12.5 HV.

17 Claims, 23 Drawing Sheets

(56) References Cited

OTHER PUBLICATIONS

Srivastava et al., "Study of Ultra High Molecular Weight Polyethylene/ HDPE/ Alumina Nanocomposites and their characterization," 2017, J. Adv. Res. Poly. Text. Engi., 4(1). (Year: 2017).*

Srivastava ; Study of Ultra High Molecular Weight Polyethylene/ HDPE/ Alumina Nanocomposites and their characterization ; J. Adv Res Poly Text Engi 4(1) ; pp. 1-9 ; 2017 ; 10 Pages.

Panin, et al. ; Influence of chemical modification and high-energy irradiation on physical-mechanical and tribotechnical properties of UHMWPE-based nanocomposites ; $13^{th}$ International Conference on Mesomechanics ; Jul. 6-8, 2011 ; 5 Pages.

Panin, et al. ; Comparative Analysis of the Influence of Nano_ and Microfillers of Oxidized Al on the Frictional—Mechanical Characteristics of UHMWPE ; Journal of Friction and Wear vol. 31, No. 5 ; pp. 371-377 ; 2010 ; 8 Pages.

Mohammed ; UHMWPE Nanocomposite Coatings Reinforced with Alumina (Al2O3) Nanoparticles for Tribological Applications ; MDPI Coatings ; Aug. 14, 2018 ; 14 Pages.

\* cited by examiner

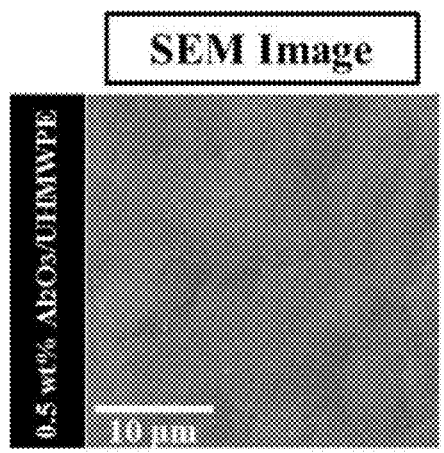
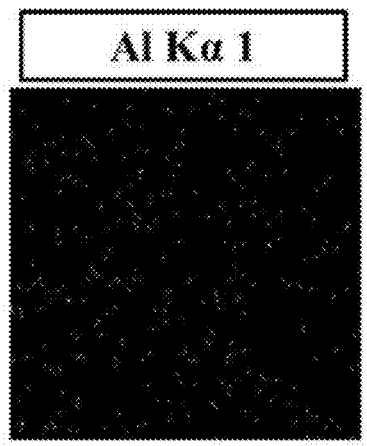
Fig. 4A    Fig. 4B
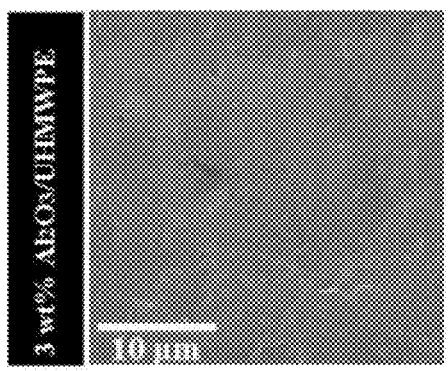
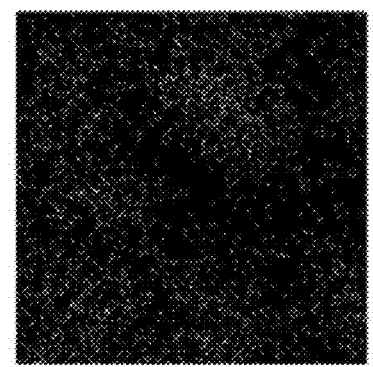
Fig. 4C    Fig. 4D
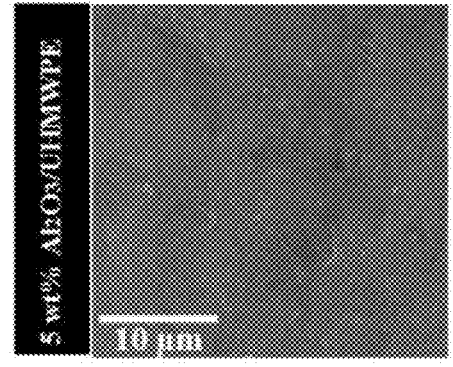
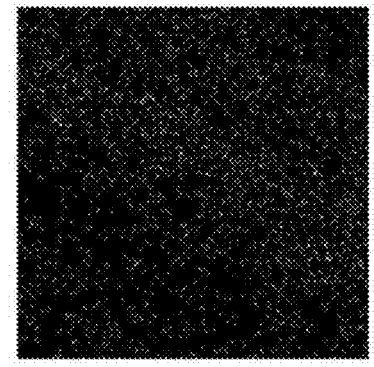
Fig. 4E    Fig. 4F
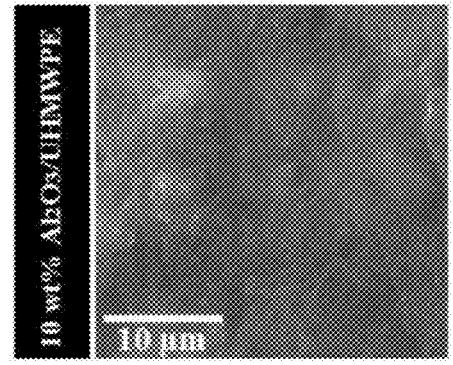
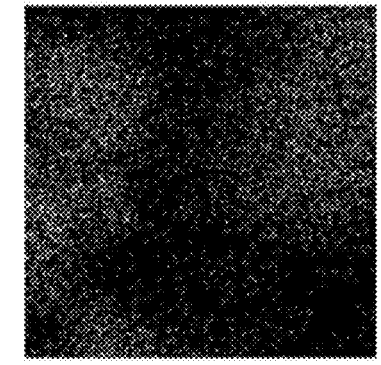
Fig. 4G    Fig. 4H

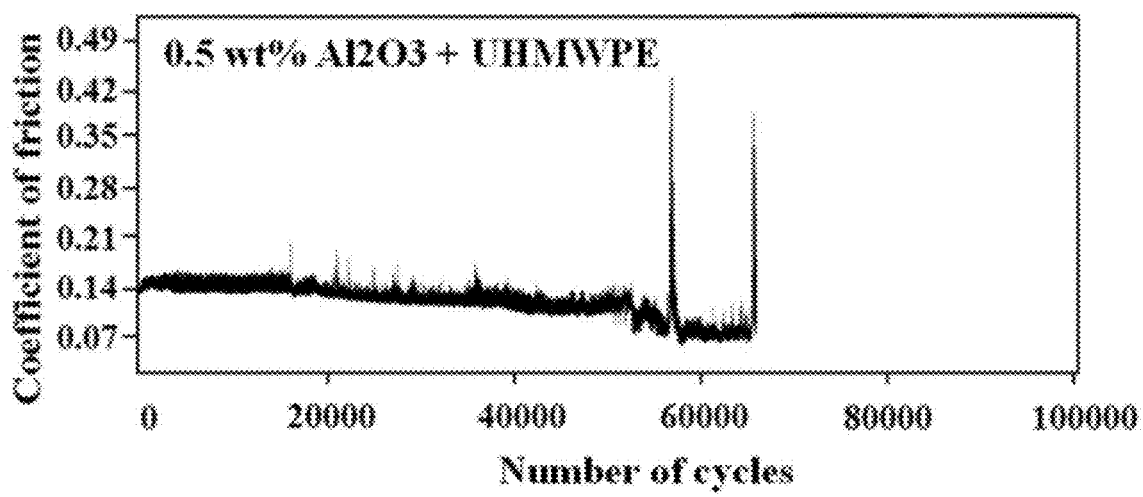
FIG. 8A
 
FIG. 8B   FIG. 8C
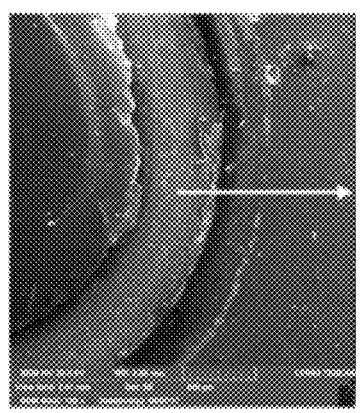 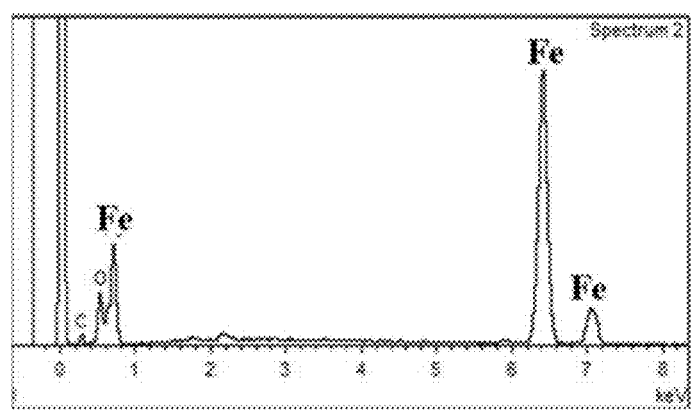
FIG. 8D   FIG. 8E

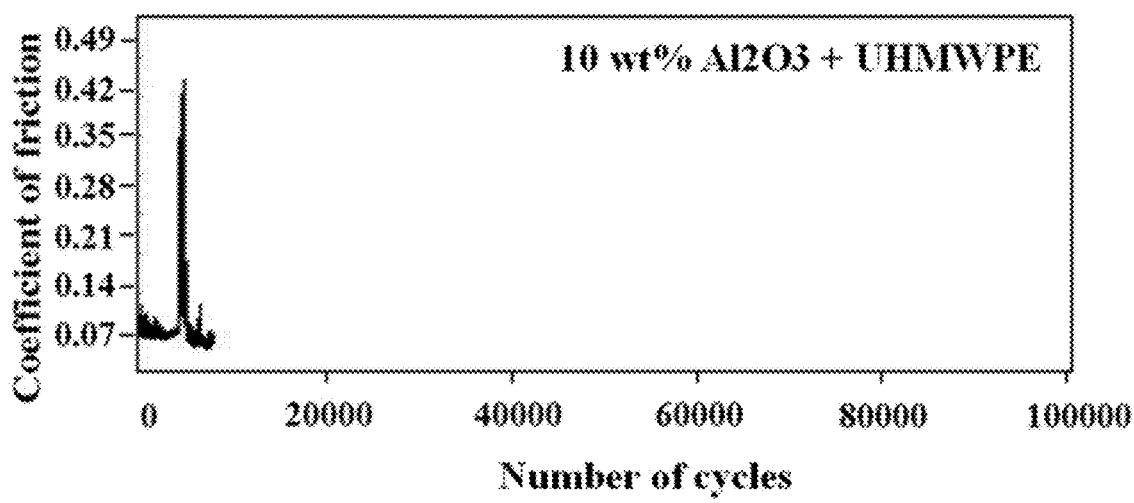
FIG. 11A
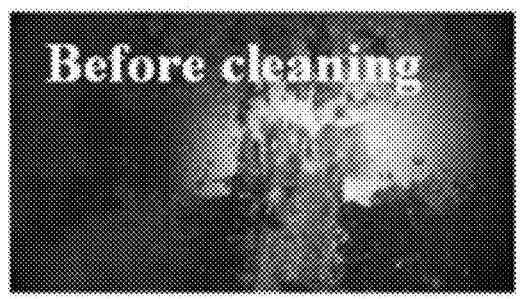 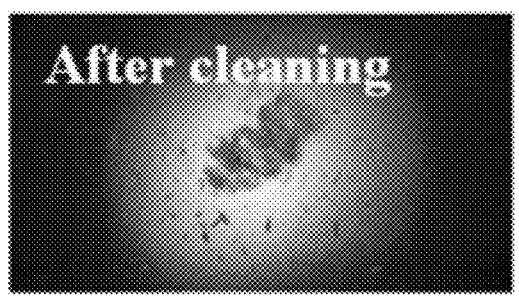
FIG. 11B                     FIG. 11C
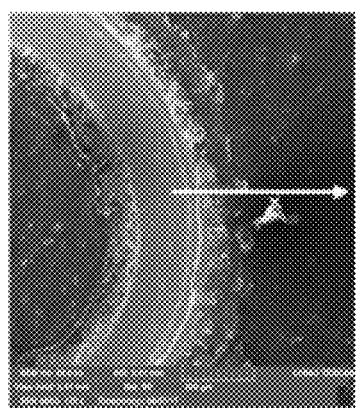 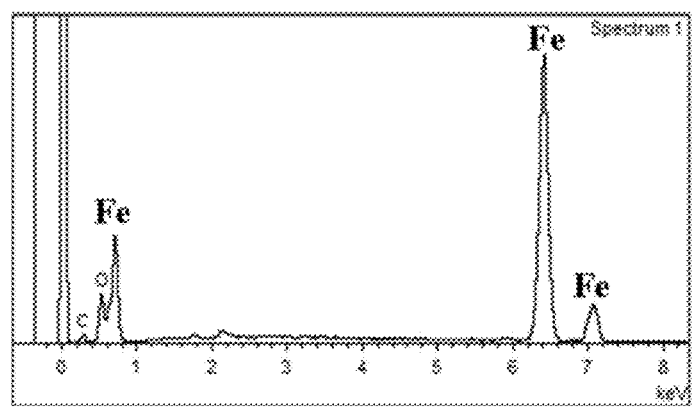
FIG. 11D            FIG. 11E

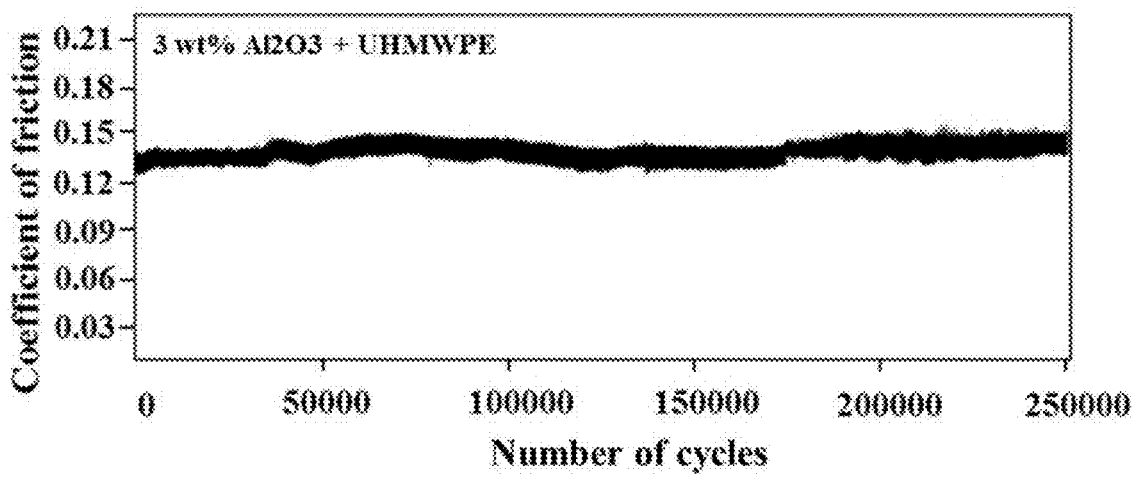
FIG. 13A
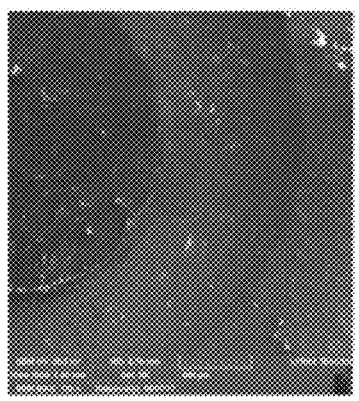     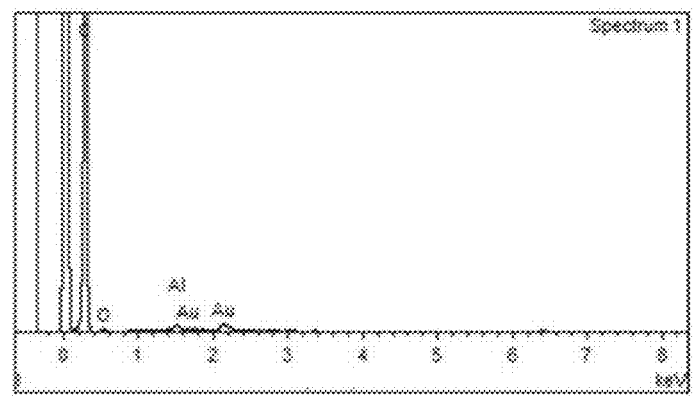
FIG. 13B          FIG. 13C

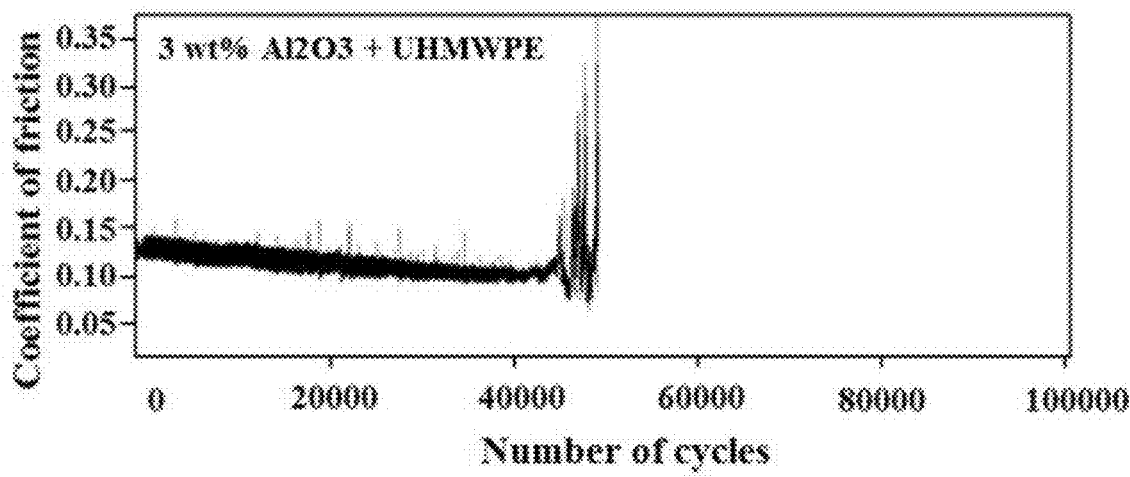
FIG. 15A
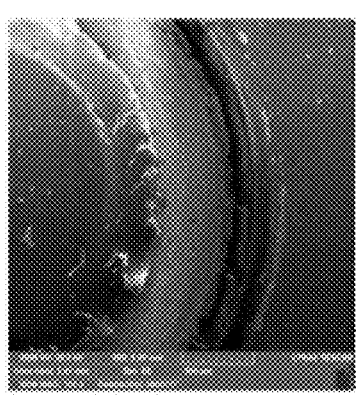
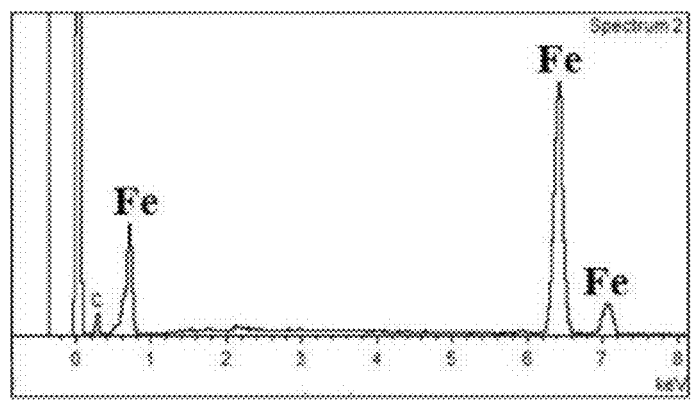
FIG. 15B    FIG. 15C

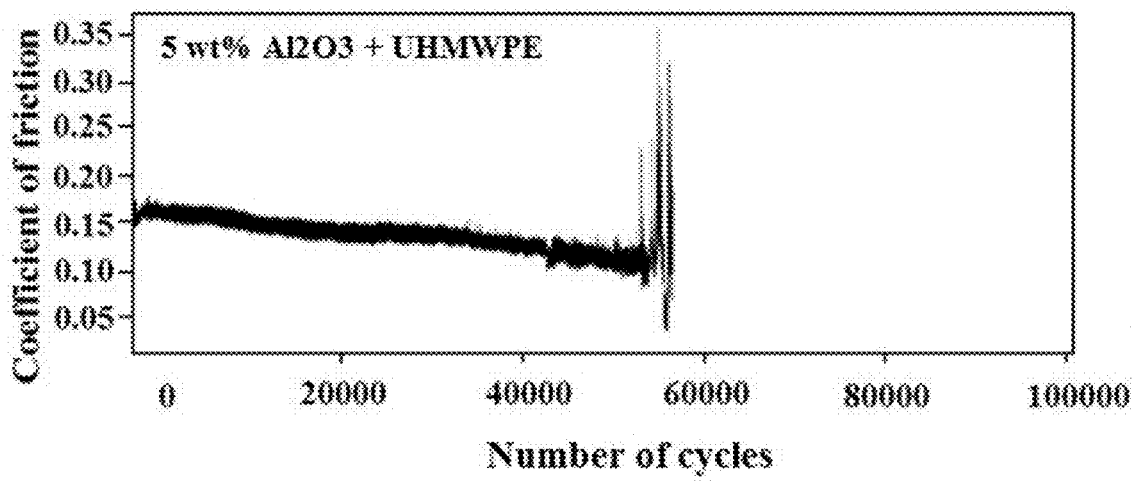
FIG. 16A
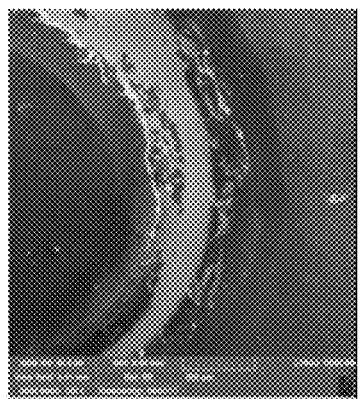 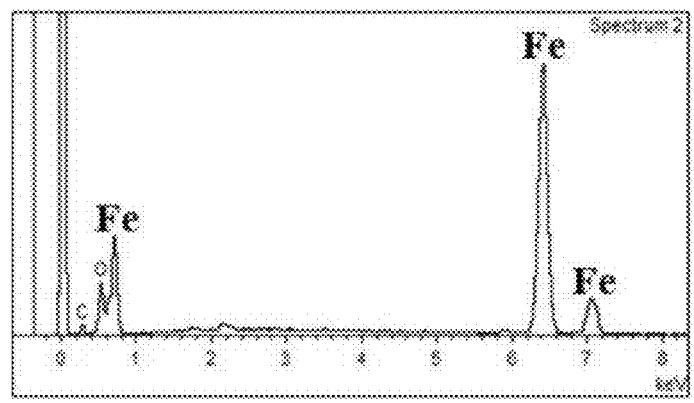
FIG. 16B    FIG. 16C

METHOD FOR FORMING A POLYETHYLENE ALUMINA NANOCOMPOSITE COATING

STATEMENT REGARDING PRIOR DISCLOSURES BY THE INVENTORS

Aspects of this technology are described in an article "UHMWPE Nanocomposite Coatings Reinforced with Alumina ($Al_2O_3$) Nanoparticles for Tribological Applications" by Mohammed, Abdul Samad in *Coatings*, 2018, 8, 280, DOI: 10.3390/coatings8080280, which is incorporated herein by reference in its entirety.

BACKGROUND OF THE INVENTION

Technical Field

The present invention relates to a method for forming a nanocomposite coating comprising alumina particles in a polyethylene matrix.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Since its development in the early 1950s, ultra-high molecular weight polyethylene (UHMWPE) has gained popularity owing to its bio-compatibility, self-lubricating properties, chemical stability, and wear and impact resistance, thereby making it an excellent choice for a range of engineering and biomedical applications. See Liu, Y. et al., *Wear* 2013, 300, 44-54; Check, J. et al., *J. Biomed. Mater. Res. Part A* 2005, 74, 687-695; Panjwani, B. et al., *J. Mech. Behav. Biomed. Mater.* 2011, 4, 953-960; Xue, Y. et al., *Polym. Test.* 2006, 25, 221-229; Minn, M. et al., *Surf. Coat. Technol.* 2008, 202, 3698-3708; and Wang, H. G. et al., *Tribol. Trans.* 2016, 59, 560-568.

In the biomedical field, UHMWPE has proven to be an excellent material for spine, hip, and implant therapies. See Xiong, D. S. et al., *Surf. Coat. Technol.* 2004, 182, 149-155; and Chandrasekaran, M. et al., *Wear* 1998, 223, 13-21. UHMWPE fibers have been used in personal and vehicle armor development, owing to its excellent impact resistance. See Zhou, Y. et al., *Materials* 2017, 10, 405. Its excellent wear and abrasion resistance have rendered it an excellent choice for industrial bearing applications. See Wang et al. (2016); and Satyanarayana, N. et al., *J. Mater. Res.* 2009, 24, 3331-3337. However, the use of pristine UHMWPE systems in demanding tribological applications has often been limited by its poor load-bearing capabilities, coupled with low thermal stability under high p-v conditions. See Samad, M. A. et al., *Tribol. Int* 2011, 44, 1932-1941; Satheesan, B. et al., *Handbook of Polymer Tribology*; World Scientific: Singapore, 2018; pp. 221-268; Selvam, S. et al., *Int. J. Appl. Eng. Res.* 2016, 11, 1298-1303. To overcome these hurdles, researchers over the years have resorted to modifying pristine UHMWPE using a variety of techniques, including, but not limited to, radiation crosslinking, ion implantation, application of diamond-like carbon (DLC) top coats, and ceramic, metallic, carbon-based, and mineral fillers' infusion into the UHMWPE matrix to produce composite systems with improved mechanical and tribological properties. See Zhang, L. et al., *Tribol. Int.* 2015, 89, 78-85; Wang, A. et al., *Tribol. Int.* 1998, 31, 17-33; Ge, S. et al., *Wear* 2003, 255, 1069-1075; Martínez-Nogués, V. et al., *J. Phys. Conf. Ser.* 2010, 252, 012006; Liu et al. (2013); Xiong, D. S. *Mater. Lett.* 2005, 59, 175-179; Plumlee, K. et al., *Wear* 2009, 267, 710-717; Cao, S. et al., *J. Reinf. Plast. Compos.* 2011, 30, 347-355; Sharma, S. et al., *Compos. Part B Eng.* 2016, 99, 312-320; Sharma, S. et al., *Wear* 2015, 332, 863-871; Arun, A. et al., *J. Chem. Pharm. Sci.* 2017, 186-189, Special Issue 2; Naresh Kumar, N. et al., *Polymers* 2016, 8, 295; Saha, D. et al., *Int. J. Art. Org.* 2007, 30, 144-152; Abdelsalam, A. E. A. et al., *Frict. Wear Res.* 2016, 4, 1-13.

Owing to its excellent tribological properties in terms of low friction and high wear resistance, recently researchers have started developing UHMWPE coatings to protect metallic mating parts in the absence of liquid lubrication. Just like in the case of bulk UHMWPE, it is essential to improve the load bearing capacity of the UHMWPE coating for better performance. One of the strategies used by researchers is to develop UHMWPE nanocomposite and hybrid nanocomposite coatings reinforced with various nanofillers, such as carbon nanotubes (CNTs), graphene, nanoclay, and nanoclay/CNTs. See Samad, M. A. et al., *Wear* 2011, 270, 395-402; Bakshi, S. R. et al., *Compos. Part A Appl. Sci. Manuf* 2007, 38, 2493-2499; Chih, A. et al., *Tribol. Int.* 2017, 116, 295-302; Azam, M. et al., *J. Tribol.* 2018, 140, 051304; and Azam, M. et al., *Prog. Org. Coat.* 2018, 118, 97-107. Azam et al. reinforced UHMWPE with different wt % of nanoclay and found that 1.5 wt % nanoclay-reinforced UHMWPE coating did not fail until 100,000 cycles at a normal load of 9 N and a linear speed of 0.1 m/s. See Azam, M. et al., *J. Tribol.* 2018, 140, 051304. However, the 1.5 wt % nanoclay/UHMWPE coating could not sustain a load of 12 N, whereby it failed immediately. To further improve the performance of the coating, they developed a hybrid nanocomposite coating reinforced with 1.5 wt % nanoclay and 1.5 wt % CNTs. See Azam, M. et al., *Prog. Org. Coat.* 2018, 118, 97-107. They reported an increase in the load-bearing capacity of UHMWPE coating to 12 N, in this case.

Of the various options available to researchers involved in the development of UHMWPE nanocomposites in bulk and in the form of coatings, ceramic nanoparticles offer a variety of properties which tend to enhance the performance of UHMWPE. See previous citations of Sharma et al. (2016); Sharma et al. (2015); and Arun et al. (2017). Alumina ($Al_2O_3$) is one such ceramic particle which presents itself as an excellent choice of a nanofiller, owing to its extremely high hardness retention at elevated temperatures, bio-inertness, ability to enhance the pristine polymer's load-bearing ability, and exceptional corrosion resistance. See the previous citations of Arun et al. (2017); Saha et al. (2007); Abdelsalam et al. (2016); and also Chanda, A. et al., *Ceram. Int.* 1997, 23, 437-447; and Roy, S. et al., *Bull. Mater. Sci.* 2002, 25, 609-612. While there are numerous studies on the development of UHMWPE bulk nanocomposites reinforced with alumina, very few studies have reported on reinforcing UHMWPE nanocomposite coatings with alumina.

In view of the forgoing, one objective of the present invention is to provide a method of forming a nanocomposite coating of alumina and polyethylene on steel substrates.

BRIEF SUMMARY OF THE INVENTION

According to a first aspect, the present disclosure relates to a method for forming a nanocomposite coating on a substrate. The nanocomposite coating comprises alumina nanoparticles dispersed within a polymeric matrix. The method involves mixing polyethylene microparticles with alumina nanoparticles in an organic solvent to form a precursor mixture. The precursor mixture is heated at a temperature in a range of 75-95° C. for 18-30 h to produce a nanocomposite powder. The nanocomposite powder is applied to the substrate heated at a temperature in a range of 160-200° C. to form the nanocomposite coating.

In one embodiment, the method further comprises sonicating the alumina nanoparticles in the organic solvent prior to the heating.

In one embodiment, the polyethylene microparticles have a mean diameter in a range of 20-120 μm.

In one embodiment, the polyethylene microparticles consist essentially of UHMWPE.

In one embodiment, the dispersed alumina present in the coating comprises alumina nanoparticles having an average diameter in a range of 5-100 nm.

In a further embodiment, the dispersed alumina present in the coating comprises alumina nanoparticles having an average diameter in a range of 8-20 nm.

In one embodiment, the applying uses an electrostatic spray deposition.

In one embodiment, the method further comprises heating the substrate at the temperature in a range of 160-200° C. for a period of 15-60 min immediately following the applying.

In one embodiment, the nanocomposite coating consists essentially of UHMWPE and alumina.

In one embodiment, the nanocomposite coating comprises 0.5-12 wt % alumina relative to a total weight of the nanocomposite coating.

In a further embodiment, the nanocomposite coating comprises 2.0-7.5 wt % alumina relative to a total weight of the nanocomposite coating.

In one embodiment, forming the coating does not include silanizing, and the coating does not comprise any silanes.

In one embodiment, the substrate comprises steel.

In a further embodiment, the substrate has a thickness in a range of 1-20 mm.

In one embodiment, the method further comprises cleaning the substrate by plasma treatment before the applying.

In one embodiment, the nanocomposite coating has an average thickness in a range of 30-100 μm on the substrate.

In one embodiment, the nanocomposite coating has a Vickers hardness in a range of 10.5-12.5 HV.

In one embodiment, the substrate has a profile roughness parameter arithmetic average, $R_a$, in a range of 0.20-0.45 μm.

In one embodiment, the nanocomposite coating has a wear resistance against a sliding normal load of 8-20 N, wherein the wear resistance is 3-6 times a wear resistance of a substantially similar polyethylene coating that does not comprise alumina nanoparticles.

In a further embodiment, the sliding normal load is a stainless steel ball having a diameter in a range of 5-10 mm.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is an FESEM image of the nanocomposite coating with 0.5 wt % alumina.

FIG. 4B is an EDS (Al) elemental mapping of the sample in FIG. 4A.

FIG. 4C is an FESEM image of the nanocomposite coating with 3 wt % alumina.

FIG. 4D is an EDS (Al) elemental mapping of the sample in FIG. 4C.

FIG. 4E is an FESEM image of the nanocomposite coating with 5 wt % alumina.

FIG. 4F is an EDS (Al) elemental mapping of the sample in FIG. 4E.

FIG. 4G is an FESEM image of the nanocomposite coating with 10 wt % alumina.

FIG. 4H is an EDS (Al) elemental mapping of the sample in FIG. 4G.

FIG. 8A is a frictional graph produced by subjecting a nanocomposite coating having 0.5 wt % alumina with a 12 N sliding load and a sliding speed of 0.1 m/s.

FIG. 8B is an image of the counterface ball used in FIG. 8A, before cleaning.

FIG. 8C is an image of the counterface ball used in FIG. 8A, after cleaning.

FIG. 8D is an FESEM image of the wear track produced from FIG. 8A.

FIG. 8E is an EDS spectrum of the wear track in FIG. 8D.

FIG. 11A is a frictional graph produced by subjecting a nanocomposite coating having 10 wt % alumina with a 12 N sliding load and a sliding speed of 0.1 m/s.

FIG. 11B is an image of the counterface ball used in FIG. 11A, before cleaning.

FIG. 11C is an image of the counterface ball used in FIG. 11A, after cleaning.

FIG. 11D is an FESEM image of the wear track produced from FIG. 11A.

FIG. 11E is an EDS spectrum of the wear track in FIG. 11D.

FIG. 13A shows a frictional graph produced by subjecting a nanocomposite coating having 3 wt % alumina with a 12 N sliding load for 250,000 cycles at a sliding speed of 0.1 m/s.

FIG. 13B shows an FESEM image of the corresponding wear track produced by the frictional graph in FIG. 13A.

FIG. 13C shows an EDS spectrum of the wear track in FIG. 13B.

FIG. 15A shows a frictional graph produced by subjecting a nanocomposite coating having 3 wt % alumina with a 15 N sliding load for 250,000 cycles at a sliding speed of 0.1 m/s.

FIG. 15B shows an FESEM image of the corresponding wear track produced by the frictional graph in FIG. 15A.

FIG. 15C shows an EDS spectrum of the wear track in FIG. 15B.

FIG. 16A shows a frictional graph produced by subjecting a nanocomposite coating having 5 wt % alumina with a 12 N sliding load for 250,000 cycles at a sliding speed of 0.1 m/s.

FIG. 16B shows an FESEM image of the corresponding wear track produced by the frictional graph in FIG. 16A.

FIG. 16C shows an EDS spectrum of the wear track in FIG. 16B.

DETAILED DESCRIPTION OF THE EMBODIMENTS

Figure 1:
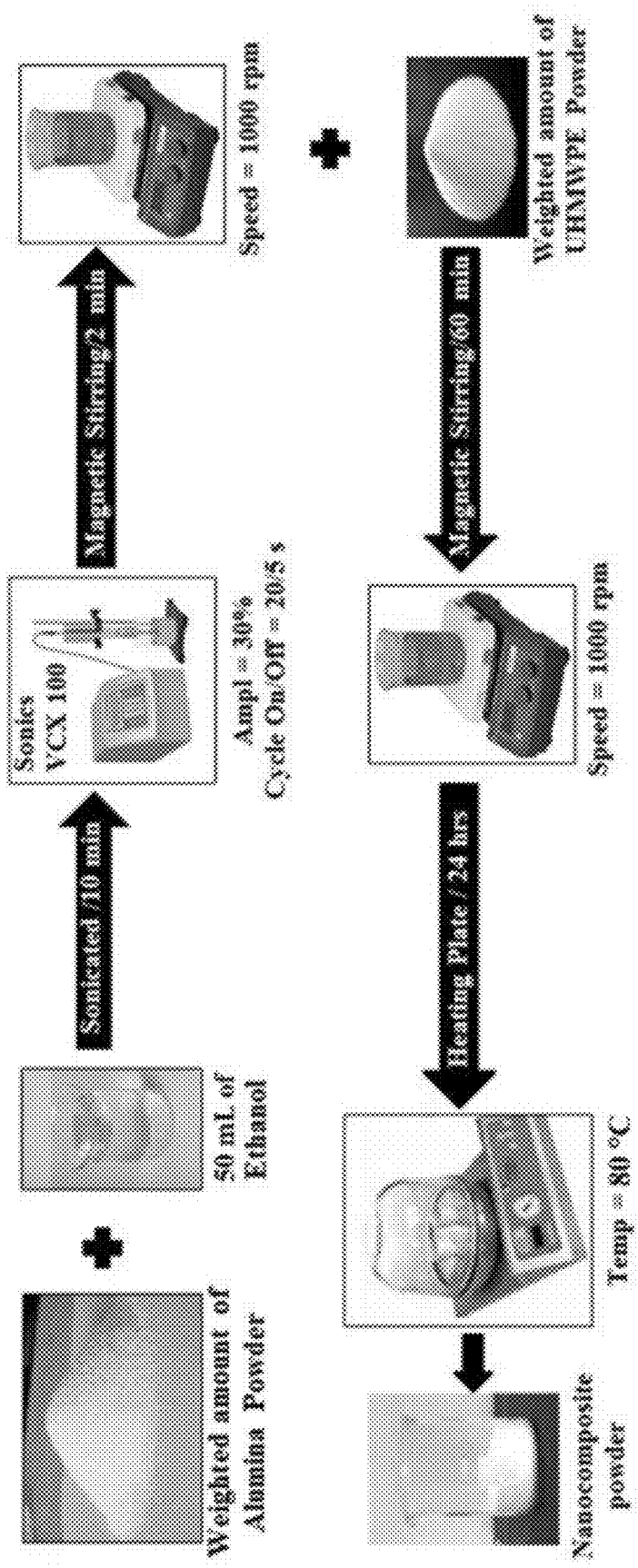
FIG. 1 is a flow chart describing the various steps in preparing the nanocomposite powders.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase). The present disclosure is intended to include all hydration states of a given compound or formula, unless otherwise noted or when heating a material. For example, Ni(NO$_3$)$_2$ includes anhydrous Ni(NO$_3$)$_2$, Ni(NO$_3$)$_2$.6H$_2$O, and any other hydrated forms or mixtures. CuCl$_2$ includes both anhydrous CuCl$_2$ and CuCl$_2$.2H$_2$O.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}$C and $^{14}$C. Isotopes of nitrogen include $^{14}$N and $^{15}$N. Isotopes of oxygen include $^{16}$O, $^{17}$O, and $^{18}$O. Isotopes of nickel include $^{58}$Ni, $^{60}$Ni, $^{61}$Ni, $^{62}$Ni, and $^{64}$Ni. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present invention is directed to a method for forming a nanocomposite coating on a substrate. The nanocomposite coating comprises alumina nanoparticles dispersed within a polymeric matrix of polyethylene.

The method comprises mixing polyethylene microparticles with the alumina nanoparticles to form a precursor mixture in an organic solvent, heating the precursor mixture to produce a dried precursor mixture, and applying the dried precursor mixture to the substrate to form the nanocomposite coating. The substrate is heated while the dried precursor mixture is applied.

Polyethylene or polythene (abbreviated PE; IUPAC name polyethene or poly(methylene)) is a common plastic. Its primary use is in packaging (plastic bags, plastic films, geomembranes, containers including bottles, etc.). Many kinds of polyethylene are known, with most having the chemical formula (C$_2$H$_4$)$_n$. This C$_2$H$_4$ monomer is ethylene (IUPAC name ethene).

PE is usually a mixture of similar polymers of ethylene with various values of n. Polyethylene is a thermoplastic; however, it can become a thermoset plastic when modified (such as cross-linked polyethylene). Ethylene is a stable molecule that polymerizes only upon contact with catalysts. The conversion is highly exothermic. Coordination polymerization is the most pervasive technology, which means that metal chlorides or metal oxides are used. The most common catalysts consist of titanium(III) chloride, the so-called Ziegler-Natta catalysts. Another common catalyst is the Phillips catalyst, prepared by depositing chromium(VI) oxide on silica. Polyethylene can be produced through radical polymerization, but this route has only limited utility and typically requires high-pressure apparatus.

In one embodiment, the polyethylene microparticles comprise Very-low-density polyethylene (VLDPE), Low-density polyethylene (LDPE), Medium-density polyethylene (MDPE), High-density polyethylene (HDPE), chlorinated polyethylene (PE-C), cross-linked polyethylene (PEX, XPE, or XLPE), and/or ultra-high molecular weight polyethylene (UHMWPE).

Very-low-density polyethylene (VLDPE) is defined by a density range of 0.880-0.915 g/cm$^3$. VLDPE is a substantially linear polymer with high levels of short-chain branches, commonly made by copolymerization of ethylene with short-chain alpha-olefins (for example, 1-butene, 1-hexene and 1-octene). VLDPE is most commonly produced using metallocene catalysts due to the greater co-monomer incorporation exhibited by these catalysts.

Low-density polyethylene (LDPE) is defined by a density range of 0.910-0.940 g/cm$^3$. LDPE has a high degree of short- and long-chain branching, which means that the chains do not pack into the crystal structure as well. It has, therefore, less strong intermolecular forces as the instantaneous-dipole induced-dipole attraction is less. This results in a lower tensile strength and increased ductility. LDPE is created by free-radical polymerization. The high degree of branching with long chains gives molten LDPE unique and desirable flow properties.

LLDPE is defined by a density range of 0.915-0.925 g/cm$^3$. LLDPE is a substantially linear polymer with significant numbers of short branches, commonly made by copolymerization of ethylene with short-chain alpha-olefins (for example, 1-butene, 1-hexene, and 1-octene). LLDPE has higher tensile strength than LDPE, and it exhibits higher impact and puncture resistance than LDPE. Lower thickness (gauge) films can be blown, compared with LDPE, with better environmental stress-cracking resistance, but is not as easy to process.

Medium-density polyethylene (MDPE) is defined by a density range of 0.926-0.940 g/cm$^3$. MDPE can be produced by chromium/silica catalysts, Ziegler-Natta catalysts, or metallocene catalysts. MDPE has good shock and drop resistance properties. It also is less notch-sensitive than HDPE; stress-cracking resistance is better than HDPE.

High-density polyethylene (HDPE) is defined by a density of greater or equal to 0.941 g/cm$^3$. HDPE has a low degree of branching. The mostly linear molecules pack together well, so intermolecular forces are stronger than in highly branched polymers. HDPE can be produced by chromium/silica catalysts, Ziegler-Natta catalysts or metallocene catalysts; by choosing catalysts and reaction conditions, the small amount of branching that does occur can be controlled. These catalysts prefer the formation of free radicals at the ends of the growing polyethylene molecules. They cause new ethylene monomers to add to the ends of the molecules, rather than along the middle, causing the growth of a linear chain. HDPE has high tensile strength.

Chlorinated polyethylene (PE-C) is an inexpensive variation of polyethylene having a chlorine content from 34 to 44%. It is used in blends with polyvinyl chloride (PVC) because the soft, rubbery chlorinated polyethylene is embedded in the PVC matrix, thereby increasing the impact resistance. In addition, it also increases the weather resistance. Furthermore, it is used for softening PVC foils, without risking plasticizer migration.

In one embodiment, the polyethylene microparticles consist essentially of ultra-high molecular weight polyethylene (UHMWPE), meaning that the polyethylene microparticles comprise at least 99.5 wt %, preferably at least 99.9 wt %, more preferably at least 99.99 wt %, or about 100 wt % UHMWPE relative to a total weight of the polyethylene microparticles.

UHMWPE is a subset of the thermoplastic polyethylene. Also known as high-modulus polyethylene, (HMPE), it has extremely long chains, with a molecular mass usually between 3.5 and 7.5 million amu. The longer chain serves to transfer load more effectively to the polymer backbone by strengthening intermolecular interactions. This results in a tough material, with the highest impact strength of any thermoplastic presently made.

UHMWPE embodies all the characteristics of high-density polyethylene (HDPE) with the added traits of being resistant to concentrated acids and alkalis, as well as numerous organic solvents. It is resistant to corrosive chemicals except oxidizing acids; has extremely low moisture absorption and a very low coefficient of friction; is self-lubricating; and is highly resistant to abrasion, in some forms being 15 times more resistant to abrasion than carbon steel. Its coefficient of friction is significantly lower than that of nylon and acetal, and is comparable to that of polytetrafluoroethylene (PTFE, Teflon®), but with UHMWPE having the advantage of better abrasion resistance than PTFE.

In one embodiment, the UHMWPE has a weight average molecular weight, or a number average molecular weight, in a range of 3,000-8,000 kDa, preferably 4,000-7,000 kDa, more preferably 4,500-6,500 kDa.

In an alternative embodiment, other polymeric compounds may be used in place or with the polyethylene. Suitable polymers may be selected from the group including, but not limited to, polyacrylates, acrylics, poly(acrylic acid), poly(acrylonitrile), poly(2-hydroxyethylmethacrylate), sodium polyacrylate, ethylene glycol dimethacrylate, poly(vinyl pyridine), poly(methyl acrylate), polymethacrylates, poly(methyl methacrylate), polychloroprene, polyacrylamide, poly(N-isopropylacrylamide), poly(tetrafluoroethylene) (PTFE), poly(N-vinyl pyrrolidone), poly(vinyl pyrrolidinone), poly(vinyl pyridine), polystyrene, poly(propylene), poly(isobutylene), poly(butylene), polyvinyl chlorides (PVC), polyvinyl chloride acetate, polyacrylonitriles, poly(ethyl acetate), poly(vinyl acetate), polyvinylacetates, polyvinyl acetate phthalate, ethylene vinyl acetates, poly (ethylene glycol), polyphenylene ethers, poly(ethylene vinyl alcohol), poly(vinylidene fluoride), poly(p-phenylenevinylene), poly(benzoxazole), polyphenylenebenzobisoxazole (PBO), polyaryletherketones, poly(ether ether ketones), polyphenylenesulfides, polyamide imides, polyarylates, polyarylsulphones, ethyl-vinyl-alcohol copolymers, copolymers of ethylene and 1-alkenes, polybutene-1, polymethylpentene, amorphous poly-alpha-olefins (APAO), terephthalates, polyacetylene, polyethylene oxides, polycycloolefins, polyisoprenes, polyamides, poly(ethylene terephthalate), poly(trimethylene terephthalate), poly(butylene terephthalate), polycarbonates, polychlorotrifluoroethylene, polyvinyldifluoride, polyperfluoroalkoxy, poly(ethylene oxide), ethylene oxide copolymers, poly(ethylene imine), poly(dimethyl siloxane), polysiloxanes, fluorosilicones, fluoropolymers, polybutadienes, butadiene copolymers, epoxidized natural rubbers, epoxy polymer resins, poly (cis-1,4-isoprene), poly (trans-1,4-isoprene), viton, phenolic resins, acrylic resins, vinylacetate resins, polyurethanes, polyurethane-urea, thermosetting polyimides, thermoplastic polyimides, poly(amic acid), polysulfones, polyetherimides, polyethersulfones, chlorosulfonates, polyoxymethylene, polyphenylene oxide, polyphenylenes, perfluorinatedpolyethylenepropylene, polyvinylidene chloride, fluoropoly (ether-imide), polyolefins, aromatic polyamides (Aramid, para-aramid), polyesters, conducting and conjugated polymers, liquid crystal polymers, liquid crystalline polyesters, vectran, biodegradable thermoplastic polyesters and their copolymers, thermosetting polyesters, unsaturated polyesters, acetals, fluorinated elastomers, rubbers, bismaleimides, copolymer rubbers, ethylene-propylene, ethylene-propylene-diene monomers (EPDM), nitrile-butadienes, nylons, thermoplastic continuous and discontinuous fiber composites, thermosetting continuous and discontinuous fiber composites, specialty polymers, and blends, mixtures, alloys, and copolymers thereof.

In one embodiment, the polyethylene microparticles have a mean diameter in a range of 20-120 µm, preferably 40-100 µm, more preferably 60-90 µm, or 75-85 µm, or about 80 µm.

In one embodiment, the dispersed alumina present in the nanocomposite coating comprises alumina nanoparticles having an average diameter in a range of 5-100 nm, preferably 6-80 nm, more preferably 7-50 nm, even more preferably 8-20 nm, or 9-18 nm, or 10-15 nm, or about 13 nm.

The polyethylene microparticles and the alumina nanoparticles may independently have a spherical shape, or may be shaped like cylinders, boxes, spikes, flakes, plates, ellipsoids, toroids, stars, ribbons, discs, rods, granules, prisms, cones, flakes, platelets, sheets, or some other shape. In one embodiment, the polyethylene microparticles may be substantially spherical, meaning that the distance from the nanoparticle centroid (center of mass) to anywhere on the microparticle outer surface varies by less than 30%, preferably by less than 20%, more preferably by less than 10% of the average distance. In a related embodiment, the alumina nanoparticles may be substantially spherical by the same definition.

In one embodiment, the alumina nanoparticles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In a preferred embodiment, the alumina nanoparticles are monodisperse having a particle diameter distribution ranging from 80% of the average particle diameter to 120% of the average particle diameter, preferably 85-115%, preferably 90-110% of the average particle diameter. In another embodiment, the alumina nanoparticles are not monodisperse. In a related embodiment, the polyethylene microparticles are monodisperse by the same definition. In another embodiment, the polyethylene microparticles are not monodisperse.

In an alternative embodiment, other nanofillers may be used in place of or along with the alumina nanoparticles. These nanofillers include but are not limited to, nanoclays, carbon nanotubes, graphene, silicates, zinc oxide, iron oxide, silicon nitride, aluminum nitride, and boron nitride. Other suitable nanofillers include, for example, carbon nanofibers, main group metal oxides, transition metal oxides, metal carbides, cermet materials, Portland cement, ceramics, glass, perovskites, layered inorganic materials, fibrillar inorganic materials, and combinations thereof.

In one embodiment, the method further comprises the step of sonicating the alumina nanoparticles in an organic solvent prior to the mixing. A concentration of the alumina nanoparticles in the organic solvent may be in the range of 5-100 g alumina nanoparticles per L organic solvent, preferably 10-80 g/L, more preferably 20-70 g/L. In another embodiment, a concentration of the alumina nanoparticles in the organic solvent may be in the range of 1-200 g alumina nanoparticles per L organic solvent, preferably 2-150 g/L, more preferably 5-100 g/L. In one embodiment, the alumina nanoparticles are sonicated in an alcohol which may be benzyl alcohol, cyclohexanol, pentyl alcohol, phenol, 1-propanol, methanol, ethanol, butanol, isopropanol, or mixtures thereof. Preferably the alcohol is methanol, ethanol, butanol, or isopropanol. In a preferred embodiment, the alcohol is ethanol.

In other embodiments, other solvents and liquids may be used for sonicating the alumina nanoparticles. The solvent may be organic or aqueous, such as, for example, water, chloroform, chlorobenzene, water, acetic acid, acetone, acetonitrile, aniline, benzene, benzonitrile, bromobenzene, bromoform, carbon disulfide, carbon tetrachloride, cyclohexane, decalin, dibromethane, diethylene glycol, diethylene glycol ethers, diethyl ether, diglyme, dimethoxymethane, N,N-dimethylformamide, ethylamine, ethyl benzene, ethylene glycol ethers, ethylene glycol, ethylene glycol acetates, propylene glycol, propylene glycol acetates, ethylene oxide, formaldehyde, formic acid, glycerol, heptane, hexane, iodobenzene, mesitylene, methoxybenzene, methylamine, methylene bromide, methylene chloride, methylpyridine, morpholine, naphthalene, nitrobenzene, nitromethane, octane, pentane, terpineol, texanol, carbitol, carbitol acetate, butyl carbitol acetate, dibasic ester, propylene carbonate, pyridine, pyrrole, pyrrolidine, quinoline, 1,1,2,2-tetrachloroethane, tetrachloroethylene, tetrahydrofuran, tetrahydropyran, tetralin, tetra methylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solvent may be a halogenated organic solvent such as 1,1,2,2-tetrachloroethane, chlorobenzene, chloroform, methylene chloride, 1,2-dichloroethane, or chlorobenzene.

The alumina nanoparticles in the organic solvent may be sonicated for a time period in a range of 2-30 min, preferably 5-20 min, or about 10 min. The sonicating may be done with a bath sonicator or a sonicating horn or probe tip. In alternative embodiments, media milling or high-shear mixing may be used instead of the sonicating. In one embodiment, cold water, such as by chilling with refrigeration or with ice, may be used as a bath to keep the sonication from overheating the organic solvent.

In one embodiment, the alumina nanoparticles may be stirred, agitated, or shaken in the organic solvent, before and/or after the sonicating, at a speed in a range of 200-5,000 rpm, preferably 500-4,000 rpm, more preferably 800-1,200 rpm for a time period of 0.5-10 min, preferably 1-5 min, more preferably about 2 min. The polyethylene microparticles may then be mixed with the alumina nanoparticles and the organic solvent, and stirred, agitated, or shaken at a speed in a range of 200-5,000 rpm, preferably 500-4,000 rpm, more preferably 800-1,200 rpm for a time period of 10 min-4 h, preferably 30 min-2 h, more preferably about 1 h. The mixing of the polyethylene microparticles and the alumina nanoparticles forms the precursor mixture.

In other embodiments, the polyethylene microparticles and the alumina nanoparticles may be mixed together as dried powders, or may be mixed together with water and/or an organic solvent without a sonication step. In another embodiment, the alumina nanoparticles may be mixed with the organic solvent and polyethylene microparticles, and this combined mixture may then be sonicated. In other embodiments, the alumina nanoparticles may be sonicated with a first organic solvent, then dried, and then mixed with a second organic solvent and the polyethylene microparticles, where the first and second organic solvents may have the same or different chemical compositions.

In one embodiment, the mixing and sonicating steps as previously described do not change the alumina nanoparticle and polyethylene microparticle weight percentages relative to their combined weight. For instance, before the mixing and sonicating, the combined components for the precursor mixture may comprise 5 wt % alumina and 95 wt % polyethylene relative to a combined weight of alumina and polyethylene, and after the mixing and sonicating, the precursor mixture may still comprise 5 wt % alumina and 95 wt % polyethylene.

In another embodiment, the mixing and sonicating steps do not change the average diameters of either alumina nanoparticle and/or polyethylene microparticle. In a further embodiment, the average diameter of the alumina nanoparticles does not change throughout the entire method of forming the nanocomposite coating, which means before and after the steps of sonicating, mixing, heating, and applying. However, in some embodiments, sonication, if used, may decrease an average diameter of the alumina nanoparticles by 0.1-20%, by 0.5-5%, or by 1-3% of its initial value. Similarly, subjecting polyethylene microparticles to sonication may decrease an average diameter by 1-50%, by 2-20%, or by 5-15% of its initial value, though it may be possible that sonicating the polyethylene microparticles does not noticeably decrease an average diameter.

In one embodiment, preferably the polyethylene microparticles are mixed with the alumina nanoparticles and an organic solvent to form a precursor mixture, and the precursor mixture is heated at a temperature in a range of 75-95° C., preferably 76-90° C., more preferably 78-85° C., or about 80° C. for 12-30 h, preferably 20-28 h, more preferably about 24 h to produce a dried precursor mixture. In other embodiments, the precursor mixture may be filtered or dried (with or without heating) to remove the organic solvent and produce the precursor mixture. The precursor mixture may be heated in an oven or on a hotplate.

The dried precursor mixture is then applied to the substrate while the substrate is heated at a temperature in a range of 160-200° C., preferably 165-195° C., more preferably 170-190° C., even more preferably 175-185° C., or about 180° C. Preferably the substrate is preheated for 1-15 min, preferably 3-10 min immediately prior to the applying. However, in another embodiment, the dried precursor mixture may be applied to the substrate while at a lower temperature, such as room temperature, and then heated to the temperatures previously mentioned. In another embodiment, immediately after the applying, the substrate is heated at the temperature in a range of 160-200° C. for a period of 15-60 min, preferably 20-50 min, more preferably 25-45 min, even more preferably 30-40 min, or about 35 min. The substrate may then be allowed to cool to room temperature. The substrate may be heated by placing on top of a heating element, such as a hot plate, by passing an electric current through the substrate to heat by resistance, heating by induction, heat gun, flame, or by placing in an oven. In other embodiments, the substrate may be heated by irradiation.

Without being bound to any particular theory, the heated substrate melts the polyethylene microparticles into a polyethylene matrix comprising the alumina nanoparticles. This melting may also allow polyethylene to strongly adhere to the substrate and/or alumina nanoparticles, conferring the hardness and wear resistance of the final product.

In one embodiment, the dried precursor mixture is applied to the substrate by pouring or scooping the dried precursor mixture onto the substrate. In a more preferred embodiment, the applying uses an electrostatic spray deposition such as delivering the dried precursor mixture to the substrate with an electrostatic spray gun or a powder coating system. In one embodiment, an electrostatic spray gun such as CRAFTSMAN Powder Coating System 17288 may be used. In one embodiment, immediately after the applying, the dried precursor mixture may have a thickness on the substrate that is 5-200%, preferably 7-100%, more preferably 10-50% greater than the thickness of the nanocomposite coating.

In alternative embodiments, a precursor mixture may be applied or sprayed onto the substrate as a wet powder or slurry rather than as a dry powder. In a further embodiment, a precursor mixture being sprayed onto the substrate in the form of droplets may use an electrostatic deposition system. In an alternative embodiment, a precursor mixture may be extruded through a heated nozzle onto the substrate.

In one embodiment, the method of forming the nanocomposite coating does not use silanes or a silanization reaction. In other words, the forming the coating does not include silanizing, and the coating does not comprise any silanes. Silanes include, but are not limited to, methyldichlorosilane, dimethyldichlorosilane, methyltrichlorosilane, trichlorosilane, phenyldichlorosilane, octyltriethoxysilane, vinyltrimethoxysilane, (3-aminopropyl)-triethoxysilane, (3-aminopropyl)-diethoxy-methylsilane, (3-aminopropyl)-dimethyl-ethoxysilane, (3-aminopropyl)-trimethoxysilane, (3-glycidoxypropyl)-dimethyl-ethoxysilane, (3-mercaptopropyl)-trimethoxysilane, (3-mercaptopropyl)-methyl-dimethoxysilane, and the like.

In another embodiment, the entire method of forming the nanocomposite does not involve heating at any temperatures above 200° C., preferably above 190° C., more preferably above 180° C. For instance, a maximum temperature used in the entire process may not exceed 200° C., may not exceed 195° C., 190° C., 185° C., 180° C., 175° C., 170° C., or 165° C. In one embodiment, the method of forming the nanocomposite coating does not use a polymerization reaction. In other words, the number average molecular weight or the weight average molecular weight of the polyethylene does not change from the mixing to the applying steps of the method. In other embodiments, the number average molecular weight or the weight average molecular weight of the polyethylene may change only slightly, for instance, by less than 2% of its original or by less than 1% of its original value (i.e. the original value being before the mixing or heating).

The nanocomposite coating may comprise 0.5-12 wt %, preferably 0.5-10 wt %, more preferably 1.0-8 wt %, more preferably 1.5-7.7 wt % or 2.0-7.5 wt %, even more preferably 2.5-6.5 wt %, or about 3 wt %, or about 5 wt % alumina relative to a total weight of the nanocomposite coating.

The nanocomposite coating may comprise 88-99.5 wt %, preferably 90-99.5 wt %, more preferably 92-99 wt %, more preferably 92.3-98.5 wt % polyethylene relative to a total weight of the nanocomposite coating.

In one embodiment, the nanocomposite coating consists essentially of UHMWPE and alumina, meaning that the nanocomposite coating comprises at least 99.5 wt %, preferably at least 99.9 wt %, more preferably at least 99.99 wt % UHMWPE and alumina, relative to a total weight of the nanocomposite coating. In a related embodiment, the dried precursor mixture consists essentially of UHMWPE and alumina.

In one embodiment, the substrate may be steel. The steel may be one or more types of carbon steel, stainless steel, weathering steel, steel wool, Eglin steel, austenitic steel, ferritic steel, martensitic steel, and/or some other type of steel.

As defined here, steel is an alloy having 55-99.98 wt %, preferably 60-99.96 wt % of elemental iron, and may further comprise carbon, chromium, aluminum, nickel, molybdenum, manganese, vanadium, tungsten, cobalt, titanium, niobium, copper, zirconium, calcium, boron, phosphorus, and/or silicon. The steel may be a low-carbon steel, a medium-carbon steel, a high-carbon steel, or an ultrahigh-carbon steels. Each has a different carbon content, wherein the carbon content has an effect on mechanical properties, with increasing carbon content leading to increased hardness and strength. More preferably, the physical properties and chemical composition of the carbon steel are suitable for application in subterranean formations, including elevated temperatures and pressures, flow of gases, fluids and solids and the presence of corrosive gases. Preferred carbon steels are carbon steels wherein at least one of manganese or chromium is present in an amount of 0.75 wt % in relation to the total steel alloy weight. These carbon steels include, but are not limited to, N-80, L-80, P-110, Q-125, J-55, C-75, C-90, C-95, QT-800, QT-900, 5LX-42, and 5LX-52 carbon steels.

In one embodiment the steel is low-carbon steel, which contains up to 0.30 wt % carbon with respect to a total weight of the steel alloy. The carbon content for high-formability steels is less than 0.10 wt % of carbon, with up to 0.4 wt % manganese with respect to a total weight of the steel alloy. For rolled steel structural plates and sections, the carbon content may be increased to approximately 0.30 wt %, with higher manganese content up to 1.5 wt %. These materials may be used for stampings, forgings, seamless tubes, and boiler plates.

In another embodiment the steel is medium-carbon steel, with medium-carbon steels being similar to low-carbon steels except that the carbon content ranges from 0.30 to 0.60 wt % and the manganese content ranges from 0.60 to 1.65 wt % with respect to a total weight of the steel alloy.

In yet another embodiment the steel is a high-carbon steel, with high-carbon steels containing from 0.60 to 1.00 wt % of carbon with manganese contents ranging from 0.30 to 0.90 wt % with respect to a total weight of the steel alloy.

In another embodiment the steel is an ultrahigh-carbon steel, with ultrahigh-carbon steels being experimental alloys containing 1.25 to 2.0 wt % carbon with respect to a total weight of the steel alloy.

In an alternative embodiment, the substrate is not steel or does not comprise steel, and may instead be copper, ceramic, silver, aluminum, pure iron, a metal oxide, silicate, or some other compound or alloy.

In one embodiment, the substrate has a thickness in a range of 1-20 mm, preferably 2-15 mm, more preferably 4-10 mm, even more preferably 5-8 mm or about 6 mm. In one embodiment, the substrate may be planar with the surface for the applying having a surface area in a range of 1 cm$^2$-1 m$^2$, preferably 2-900 cm$^2$, more preferably 3-250 cm$^2$, though in some embodiments, surface areas larger than 1 m$^2$ may be used.

In one embodiment, the substrate may be cleaned before the applying. The substrate may be cleaned by sonicating in any of the previously mentioned organic solvents or by exposing to oxygen or air plasma, ozone, or UV irradiation. In other embodiments, the substrate may be cleaned by polishing or grinding. Preferably the substrate is cleaned by grinding, sonicating, and air plasma treatment. The grinding or polishing may be used to produce a profile roughness parameter arithmetic average, $R_a$, in a range of 0.20-0.45 µm, preferably of 0.25-0.43 µm, more preferably of 0.30-0.40 µm, or about of 0.32-0.38 µm. In other embodiments, the $R_a$, may be lower, for instance, in a range of 0.10-0.20 µm. The substrate may be sonicated for a time period in a range of 5-30 min, preferably 10-20 min, or about 15 min. The plasma treatment may be carried out for 5-30 min, preferably 7-15 min, or about 10 min using air plasma generated with an RF power in a range of 10-50 W, preferably 15-40 W, more preferably 25-35 W.

Following the applying step and any subsequent cooling, the nanocomposite coating has an average thickness in a range of 30-100 μm, preferably 35-90 μm, more preferably 40-80 μm, even more preferably 45-75 μm, or 50-60 μm. This thickness refers to the average thickness of the nanocomposite coating on the substrate. In one embodiment, the nanocomposite coating has a density in a range of 0.92-1.30 g/cm$^3$, preferably 0.93-1.20 g/cm$^3$, more preferably 0.94-1.10 g/cm$^3$. In one embodiment, nanocomposite coating has a void volume percentage of less than 1%, preferably less than 0.5%, more preferably less than 0.1% or about 0%. A nanocomposite coating that is heated for a shorter time, at a lower temperature, or with large sized polyethylene microparticles may have a greater void volume percentage.

In one embodiment, the nanocomposite coating has a Vickers hardness in a range of 10.5-12.5 HV, preferably 10.7-12.4 HV, more preferably 10.9-12.3 HV, even more preferably 11.2-12.2 HV. In one embodiment, the nanocomposite coating has a fracture toughness in a range of 10-1,000 Pa·m$^{1/2}$, preferably 50-700 Pa·m$^{1/2}$, more preferably 60-650 Pa·m$^{1/2}$. The fracture toughness may be determined by the indentation method or some other technique.

In one embodiment, the nanocomposite coating has a wear resistance against a sliding normal load of 8-20 N, preferably 9-18 N, more preferably 10-17 N, or about 12 N or about 15 N, wherein the wear resistance is 3-6 times, preferably 3.5-5.5 times, or about 5 times a wear resistance of a substantially similar polyethylene coating that does not comprise alumina nanoparticles. In one embodiment, the wear resistance is measured by a tribometer using a ball on disc configuration. In other embodiments, other tribometer configurations may be used such as four ball, pin on disc, ball on disc, ring on ring, ball on three plates, reciprocating pin, block on ring, bouncing ball, or twin disc. The wear to the nanocomposite coating may result from adhesive wear, abrasive wear, surface fatigue, fretting wear, and/or erosive wear. A material having a higher wear resistance means that it experiences less wear.

In one embodiment, the wear resistance may be related to a net loss of material, or the depth of a track formed on the nanocomposite coating following cycles of the sliding normal load. For instance, where the nanocomposite coating has a wear resistance 4 times a wear resistance of a substantially similar polyethylene coating that does not comprise alumina nanoparticles, the nanocomposite coating may have a wear track that is 24 μm, while the polyethylene coating may have a wear track that is about 96 μm, for the same configuration of tribological testing (same number of cycles, same load, same speed, etc.). Examples of wear track depths are shown in FIGS. 12A-12D. In one embodiment, the wear resistance may be related to a total number of cycles of wear until failure. In another embodiment, the wear resistance may be related to the rate of material loss due to wear.

In one embodiment, the sliding normal load is a stainless steel ball having a diameter in a range of 5-10 mm, preferably 5.5-8 mm, more preferably 6-7 mm, or about 6.3 mm. In one embodiment, the stainless steel ball may comprise 440C stainless steel and may have a hardness value of about 62 RC. The sliding normal load may be applied to the nanocomposite coating at a linear speed in a range of 0.05-0.5 m/s, preferably 0.08-0.2 m/s, more preferably 0.09-0.15 m/s or about 0.1 m/s. A total sliding distance may be in a range of 500-2,000 m, preferably 800-1,500 m, more preferably 1,000-1,300 m. The sliding normal load may be applied for 10,000-300,000 cycles, preferably 50,000-250,000 cycles, more preferably 90,000-200,000 cycles, even more preferably 100,000-150,000 cycles. After 100,000 cycles exactly, the nanocomposite coating may have a wear track with a depth in a range of 10-60 μm, preferably 15-50 μm, more preferably 17-30 μm. In one embodiment, the nanocomposite coating has a wear rate in a range of $1\times10^{-6}$-$5\times10^{-4}$ mm$^3$/N·m, preferably $5\times10^{-6}$-$3\times10^{-4}$ mm$^3$/N·m, more preferably $1\times10^{-5}$-$1\times10^{-4}$ mm$^3$/N·m, where the unit mm$^3$/N·m represents the volume of material lost per weight of the sliding load per distance traveled by the sliding load. In one embodiment, the nanocomposite coating has a wear coefficient in a range of $5\times10^{-8}$-$1\times10^{-4}$, preferably $1\times10^{-7}$-$5\times10^{-5}$, more preferably $1.5\times10^{-7}$-$1\times10^{-6}$.

In one embodiment, the nanocomposite coating has a coefficient of friction (preferably dry, kinetic friction) in a range of 0.09-0.20, preferably 0.10-0.17, more preferably 0.11-0.15.

In one embodiment, the mechanical properties of the nanocomposite coating, such as wear resistance and hardness are dependent on the substrate. For instance, switching to a softer substrate or thinner substrate may decrease the hardness measured of the nanocomposite coating. However, in other embodiments, the mechanical properties are independent of the type of substrate. In yet additional embodiments, some mechanical properties are dependent on the type of substrate while others are independent.

In one embodiment, the nanocomposite coating may be used in a medical implant, a piece of machinery (including for vehicles), containers, or in electronics housings. In other embodiments, the substrate of the nanocomposite coating may be steel that may be a part of a building, a bridge, a sign, a sculpture, an intermodal container, a wire, a train car, a railing, a cable, a ship, an aircraft, an automobile, a fire hydrant, a mailbox, a bicycle, a fence, a scaffolding, a pipeline, an oil well, a gas well, a storage tank, a construction equipment, a battery, a chain link, or a piece of furniture. The steel may be located outdoors, though in some instances the steel may be located indoors, such as an air duct, an exhaust hood, a plumbing, an electrode, or a part of an appliance. Preferably the steel may be prone to rusting or corrosion, such as steel located outdoors or otherwise exposed to humidity, acids, salts, or some other corrosive agent.

In one embodiment, a nanocomposite coating suffering wear or damage may be repaired or reinforced by heating as described in any of the previously mentioned heating steps. The worn or damaged nanocomposite coating may have an additional nanocomposite powder applied prior to the heating.

The examples below are intended to further illustrate protocols for preparing, characterizing the nanocomposite coating and uses thereof, and are not intended to limit the scope of the claims.

Example 1

Materials and Methods

Square stainless steel coupons of 25×25 mm$^2$ with a thickness of 6 mm were selected as substrates for depositing the coating. UHMWPE in powder form, with an average particle size of 80 μm, was procured from Goodfellow Co., London, UK. Nanopowder of alumina, which is used for reinforcing the polymer matrix, was procured from Sigma Aldrich, Darmstadt, Germany, with an average particle size of 13 nm.

Preparation of Nanocomposite Powders

FIG. 1 presents a flow chart of the complete procedure of preparing the UHMWPE nanocomposite powders with different loadings (0.5, 3, 5, and 10 wt %) of alumina. The procedure was selected keeping in view the importance of the uniform dispersion of the reinforcement (alumina) in the polymer matrix to achieve the best possible properties. As can be seen from the flow chart, the procedure is a combination of sonication and magnetic stirring to achieve a good distribution of the alumina particles in UHMWPE matrix.

Coating Procedure

Figure 2:
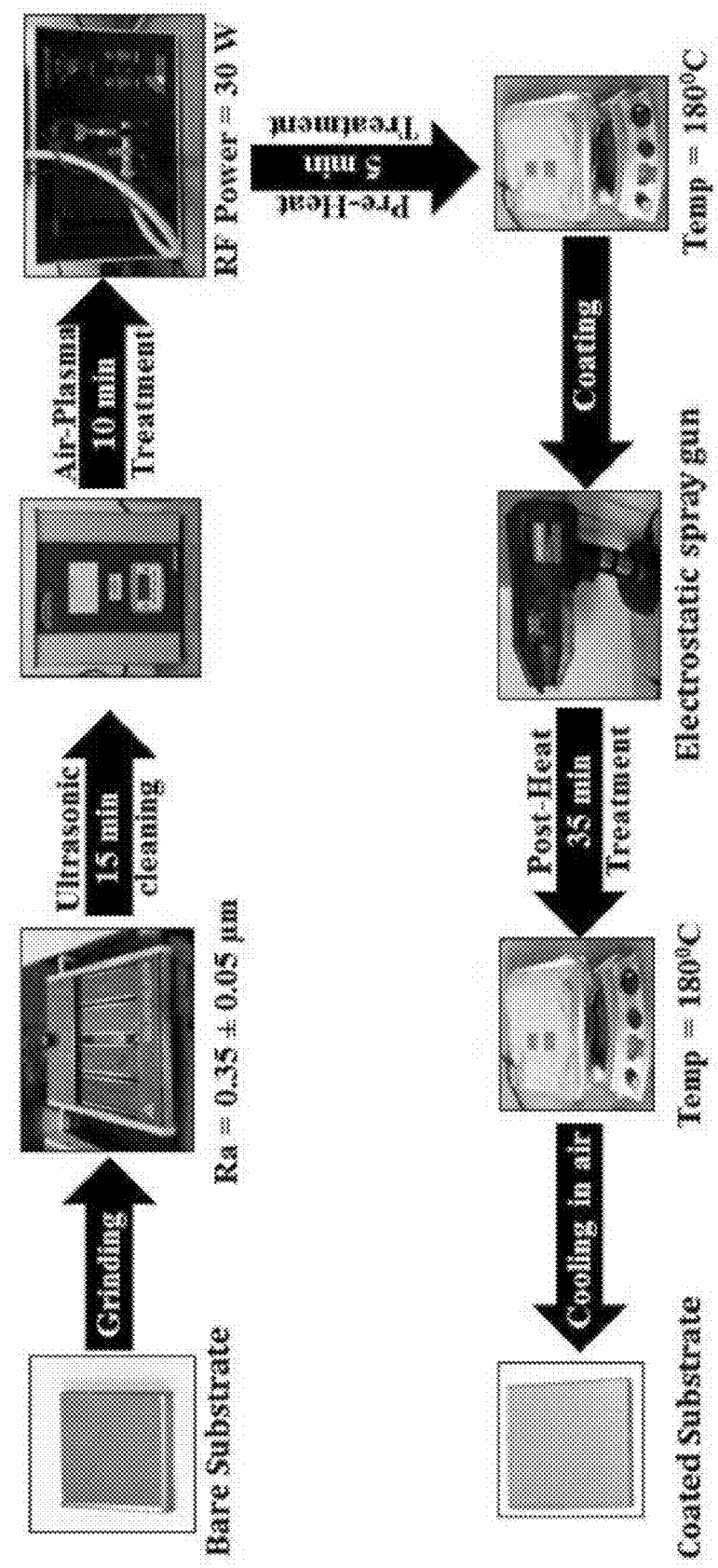
FIG. 2 is a flow chart listing the steps involved in surface preparation and coating of the steel substrates.

The coating procedure used for depositing the nanocomposite powders on steel substrates is divided into two steps, namely, surface preparation, and coating. FIG. 2 explains the surface preparation procedure in terms of cleaning and functionalizing the substrates for better adhesion and coating procedure, in terms of depositing the powders and their consolidation. The surface preparation steps include grinding/polishing, ultrasonic cleaning, plasma treatment, and pre-heat treatment. Previous studies have shown that plasma treatment is effective in cleaning surfaces and functionalizing them resulting in a significant increase in its surface free energy, which helps in increasing the adhesion between the substrate and the coating. See Samad, M. A. et al., *Surf. Coat. Technol.* 2010, 204, 1330-1338.

Coating on the pre-heated steel substrates was carried out using a Craftsman® electrostatic spray gun (Craftsman Tools, Stanley Black & Decker, Inc., Hartford, Conn., USA). After the deposition of the powders, the coated steel substrates were subjected to a post-heat treatment process at 180° C. for 35 min, and then air cooled for the consolidation of the polymer powder.

Characterization Techniques

Figure 3:
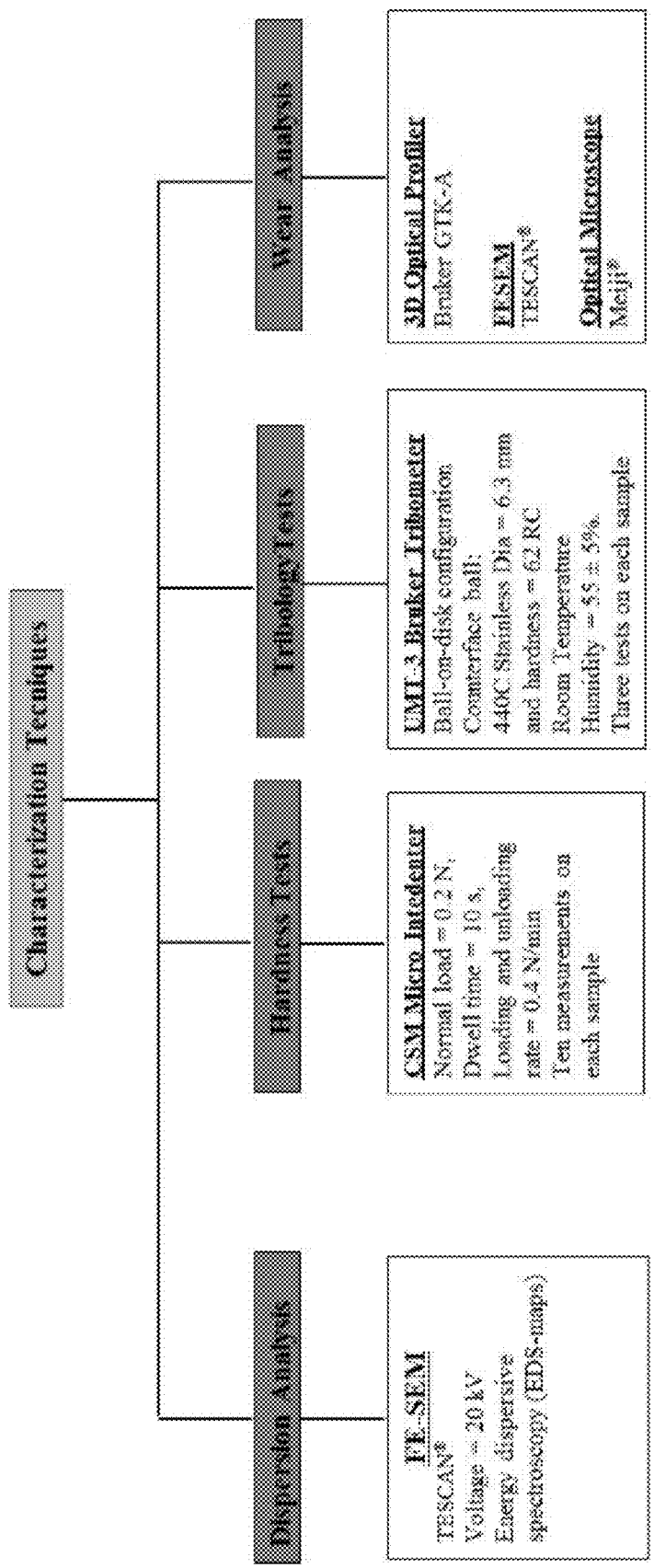
FIG. 3 is summary of the characterization techniques used.
Figure 5A:
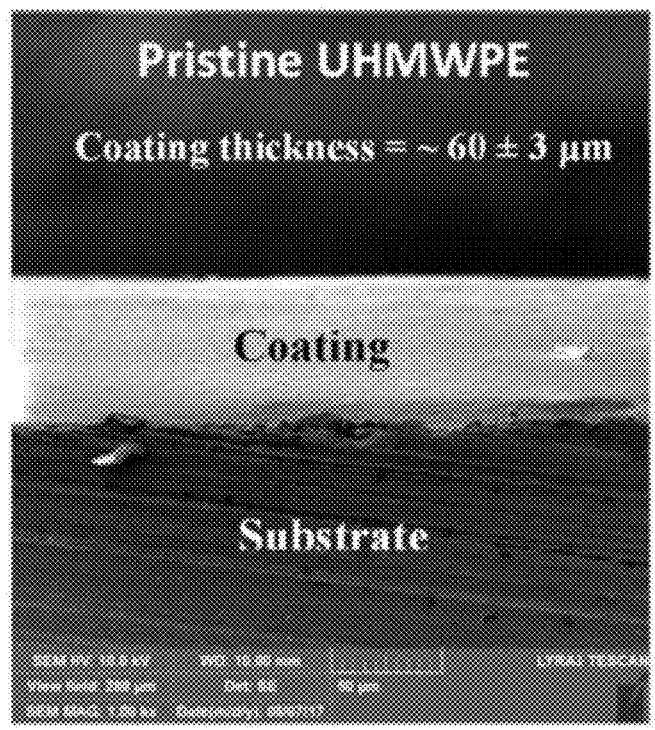
FIG. 5A is an FESEM cross-sectional image of the pristine coating/substrate system.
Figure 5B:
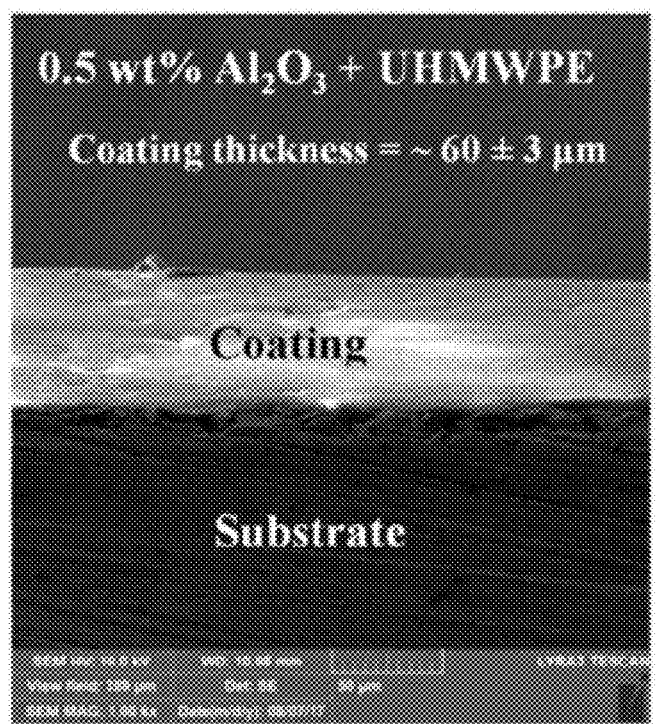
FIG. 5B is an FESEM cross-sectional image of the 0.5 wt % alumina nanocomposite coating/substrate system.
Figure 5C:
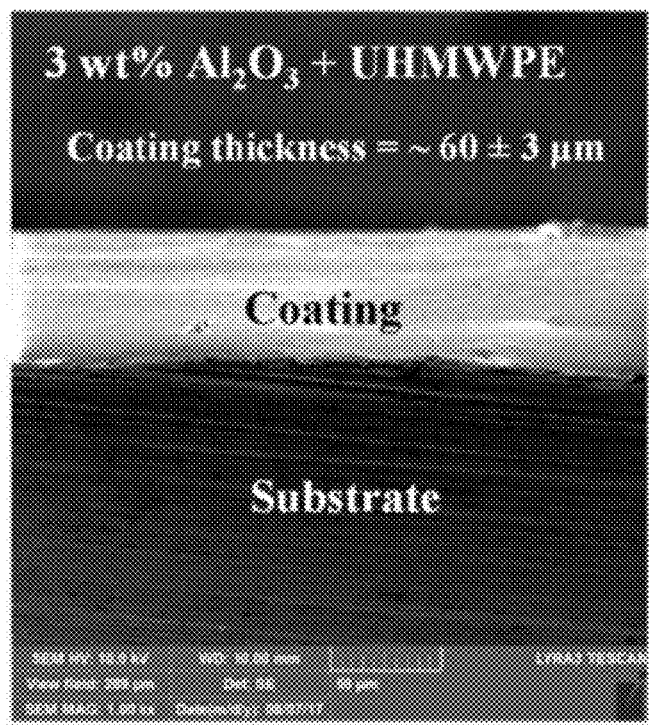
FIG. 5C is an FESEM cross-sectional image of the 3 wt % alumina nanocomposite coating/substrate system.
Figure 5D:
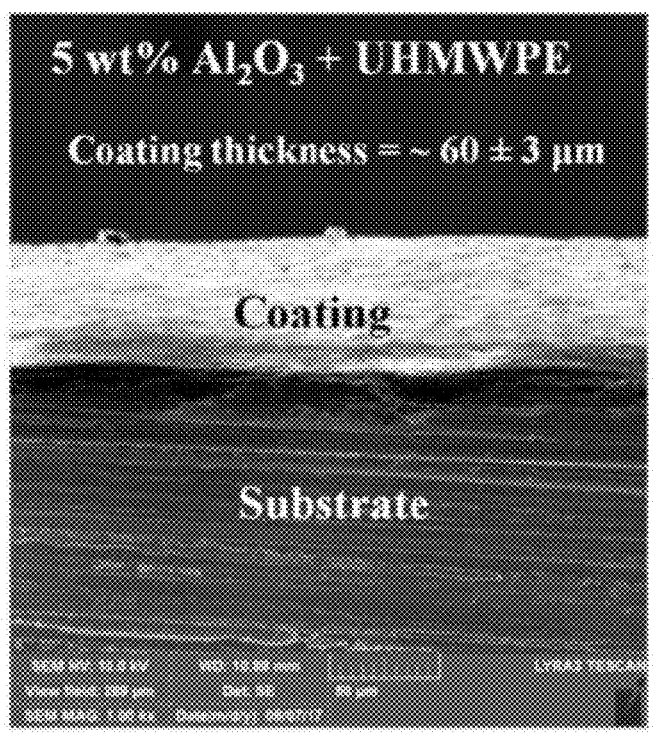
FIG. 5D is an FESEM cross-sectional image of the 5 wt % alumina nanocomposite coating/substrate system.
Figure 5E:
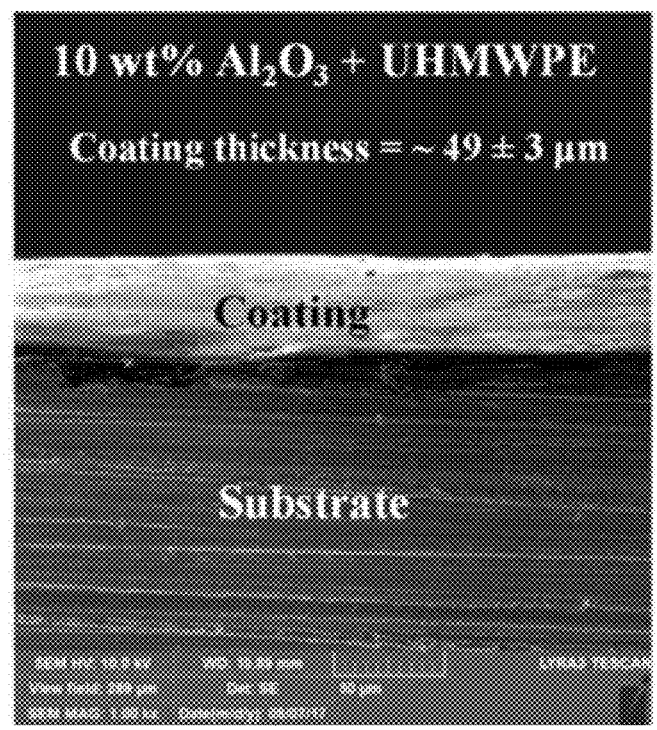
FIG. 5E is an FESEM cross-sectional image of the 10 wt % alumina nanocomposite coating/substrate system.

FIG. 3 shows the various characterization techniques used in this study, and the details of the equipment and settings used for each characterization.

Field emission scanning electron microscope (FESEM, TESCAN®, Brno, Czech Republic) attached with a secondary electron detector (TESCAN®, Brno, Czech Republic) was used at a voltage of 20 kV to analyze the dispersion of alumina in the UHMWPE polymer matrix. Energy dispersive spectroscopy (EDS, Oxford Instruments, Concord, Mass., USA) mapping was conducted to observe the dispersion of alumina in the polymer matrix.

Field emission scanning electron microscope (TESCAN®) was also used to measure the thickness of the coatings by observing the cross-section of the samples. To measure the thickness, the edges/sides of the square coated samples were carefully polished and coated with a very thin layer of gold, prior to observing them under FESEM. Three measurements on each edge, totaling to twelve measurements for each sample, were recorded, and the average value is reported.

Micro indentation equipment (CSM Instruments®, Peseux, Switzerland) equipped with pyramidal-shaped diamond indenter, was used to measure the hardness of the coatings. A normal load of 0.2 N with a dwell time of 10 s and a loading/unloading rate of 0.4 N/min, was used. Ten measurements, at different locations on each sample, were recorded, and the average value is reported. The original measured units of hardness from the equipment were MPa. However, they were converted to Vickers Hardness values and reported in the present study.

A tribometer (UMT-3, Bruker, Campbell, Calif., USA) was used with a ball on disc configuration to evaluate the tribological properties of the coatings under dry conditions at room temperature and a relative humidity of 55%±5%. A stainless steel (grade 440C) ball with a diameter of 6.3 mm and a hardness of 62 RC was used as a counterface. The counterface ball was cleaned properly with acetone prior to each test. Optical images of the counterface ball were recorded and used to evaluate the transfer film phenomenon. Three wear tests for each coating were conducted, and the average value of wear life and coefficient of friction (COF) are reported.

A 3D optical profilometer (GTK-A, Bruker, Campbell, Calif., USA) was used to measure the profile depth at different locations. The surface area of the profile was estimated using the vision 64 software (Version 5.6) attached to the optical profilometer. The total wear volume loss was calculated by multiplying the surface area with the circumference of the wear track ($2\pi r$, where r is the wear track radius). The specific wear rate was estimated by taking the ratio of the total volume loss to (normal load×total sliding distance).

FESEM was further used to analyze the wear tracks to understand the wear morphology and determine the different wear mechanisms involved for each type of the coating during the wear tests. EDS analysis on the wear tracks was also performed for the confirmation of coating failures.

Example 2

Results and Discussion

Dispersion Analysis of Alumina Nano Filler in UHMWPE Polymer Matrix Using FESEM/EDS Elemental Mapping FESEM images coupled with EDS elemental mapping were used to evaluate the dispersion analysis of nanofillers in polymer matrix. FIGS. 4A-4H show the FESEM images of the nanocomposite coatings with different loadings (0.5, 3, 5, and 10 wt %) of alumina, and the corresponding elemental mapping spectrums of aluminum. As can be observed from the figures, there was no sign of any agglomeration of alumina nanoparticles for the nanocomposite coatings with 0.5, 3, and 5 wt % loadings of alumina. However, as the alumina content increased to 10 wt %, significant agglomerates were observed, suggesting non-uniform dispersion of the nanofiller.

Evaluation of Thickness of the Pristine and the Nanocomposite Coatings

FESEM images were taken at the edges/sides of the square coated samples to evaluate the thickness of the nanocomposite coatings. FIGS. 5A-5E show FESEM images of all the pristine and nanocomposite UHMWPE coatings. It can be observed that there was no significant change in the coating thickness for the pristine UHMWPE coating and the nanocomposite coatings with 0.5, 3, and 5 wt % loadings of alumina, which was about 60±3 µm. However, there was a slight reduction in the coating thickness to 49±3 µm for the 10 wt % alumina reinforcement. This can be attributed to the increased content of thermally conductive alumina, which helps in distributing the heat more uniformly during the polymer consolidation process. It is to be noted that UHMWPE becomes very viscous when heated beyond its melting point, which hinders its uniform flow over the steel substrate during the post-heat treatment process. However, when alumina nanoparticles, which have a good thermal conductivity are added to the polymer matrix, it helps in a better distribution of heat within the polymer matrix, aiding in the flow of the polymer over the substrate during the consolidation process. Thus, in the case of 10 wt % of alumina, this phenomenon can be clearly seen, whereby the viscous polymer flows more freely over the substrate, due to the uniform heat distribution resulting in a slight reduction in the coating thickness.

Evaluation of Hardness of the Pristine and the Nanocomposite Coatings

Figure 6:
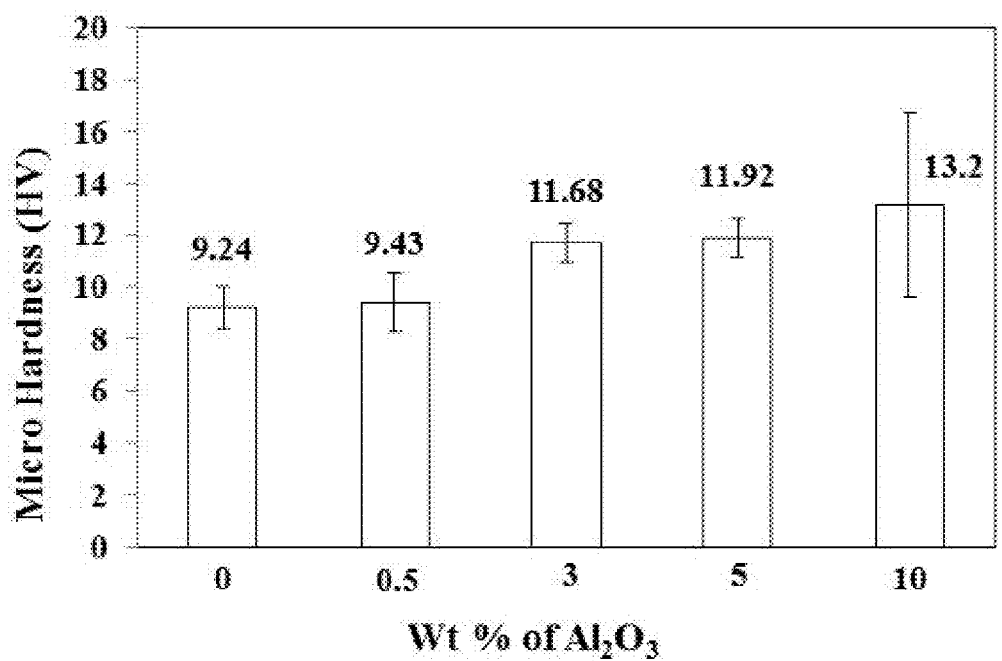
FIG. 6 shows the micro hardness of the pristine and the nanocomposite coatings.

FIG. 6 shows the variation of hardness with alumina content. As can be observed from the figure, hardness, in general, increased with the addition of alumina nanofiller in the UHMWPE polymer matrix. The improvement in hardness of the nanocomposite coating with the increasing content of alumina (0.5, 3, and 5 wt %) can be attributed to the uniform dispersion of the nanofillers and the effective bonding between the nanofillers and the polymer matrix, which helps in resisting indentation. Even though the average hardness value for the nanocomposite coating reinforced with 10 wt % of alumina seems to be higher than the rest of the coatings, large variations in the measurements are observed. These variations can be attributed to the agglomeration of alumina particles in the polymer matrix (FIGS. 4A-4H), which leads to the formation of a two-phase system, with the agglomerates acting as a hard phase, and the polymer matrix as a soft phase, resulting in non-uniform properties.

Tribological Performance of the Pristine UHMWPE Coatings

Figure 7A:
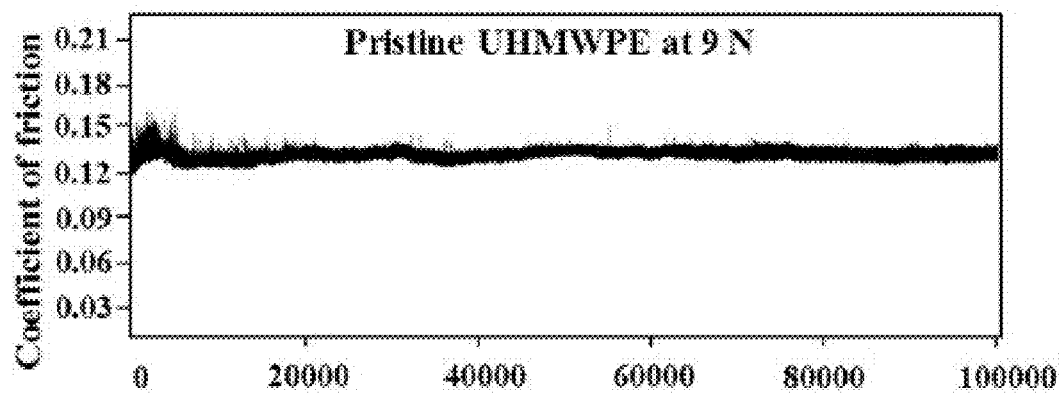
FIG. 7A shows a frictional graph produced by subjecting pristine UHMWPE with a 9 N sliding load and a sliding speed of 0.1 m/s for 100,000 cycles.
Figure 7B:
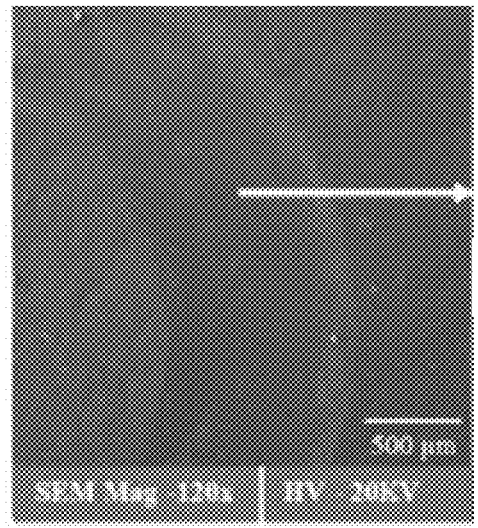
FIG. 7B is an FESEM image of the corresponding wear track for FIG. 7A.
Figure 7C:
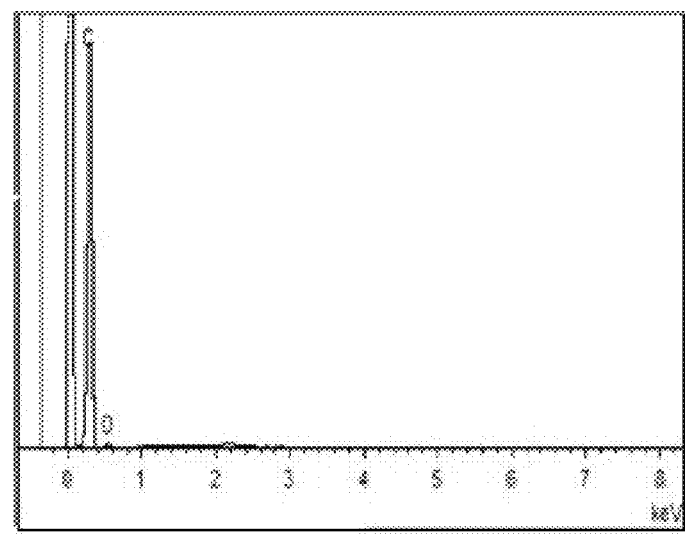
FIG. 7C is an EDS spectrum of the wear track in FIG. 7B.
Figure 7D:
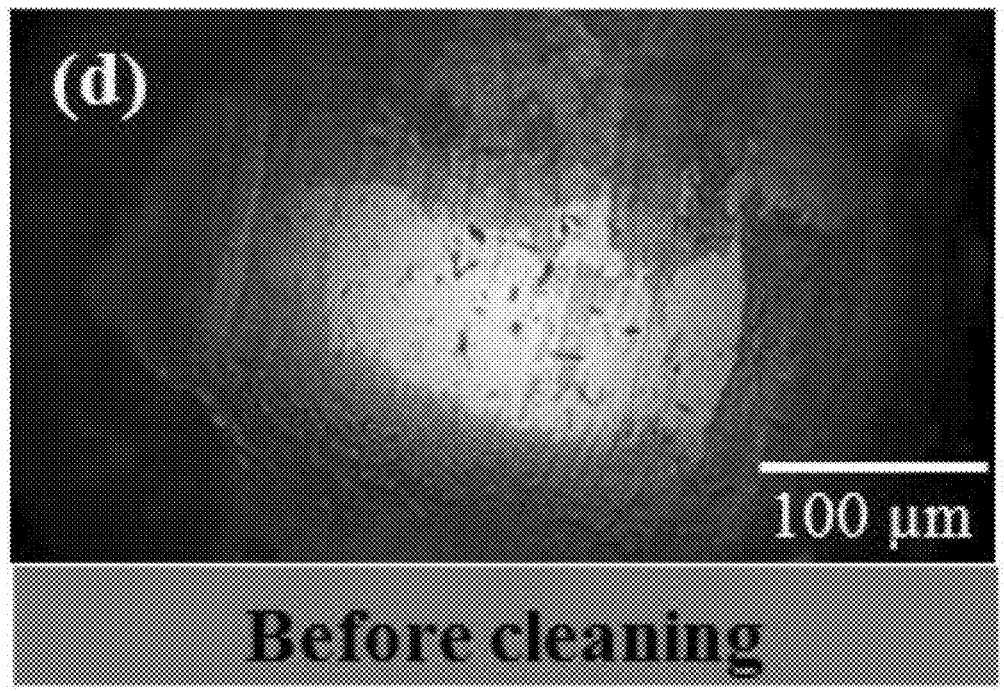
FIG. 7D is an image of the counterface ball used in FIG. 7A, before cleaning.
Figure 7E:
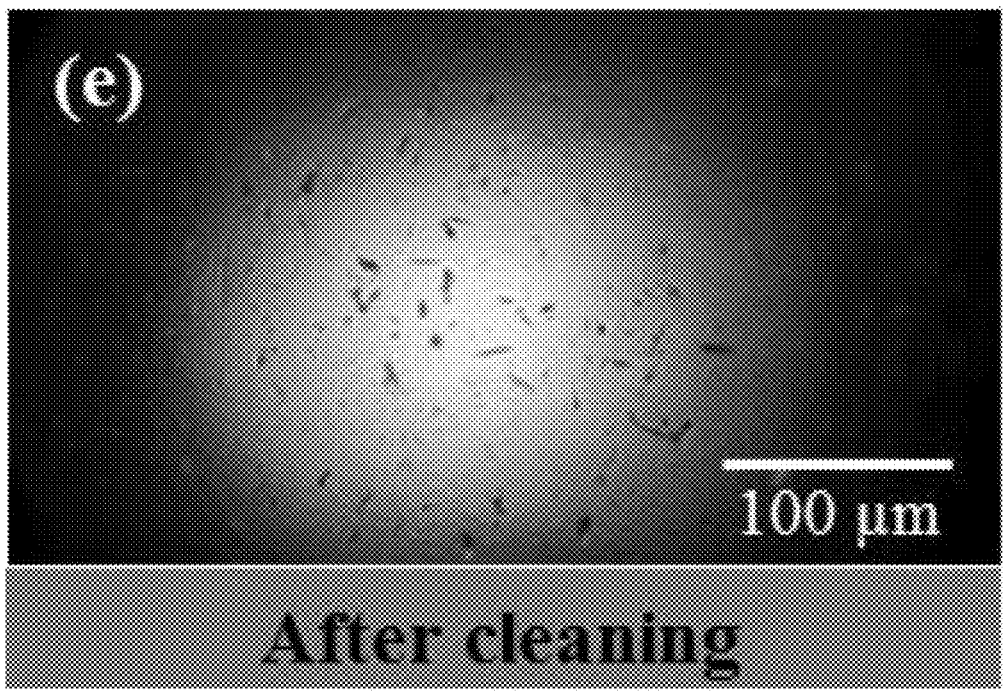
FIG. 7E is an image of the counterface ball used in FIG. 7A, after cleaning.

Sliding tests under dry conditions were conducted on pristine UHMWPE coatings deposited on steel substrates to determine its load bearing capacity and wear life under different normal loads. Hence, wear tests were conducted initially at a normal load of 9 N, and a sliding speed of 0.1 m/s (480 rpm) for a sliding distance of 1.25 km, corresponding to 100,000 sliding cycles. FIG. 7A shows the typical frictional graph; FIG. 7B shows FESEM image of the wear track after the test, FIG. 7C shows EDS spectrum carried out on the wear track, FIG. 7D shows the counterface optical ball images immediately after the wear test, and FIG. 7E shows the counterface optical ball image after cleaning with acetone after the wear test for the test carried out on the pristine UHMWPE coating at a normal load of 9 N. It can be observed from the frictional graph that the coating did not fail even until 100,000 cycles, and displayed a uniform frictional graph with an average steady state coefficient of friction (COF) of ~0.13. Moreover, the FESEM image of the wear track after the wear test does not show any indication of failure, and the wear track is smooth, suggesting that only plastic deformation of the polymer happened during the sliding. The EDS spectrum also confirms the non-failure of the coating as no peak of iron (Fe) corresponding to the steel substrate is displayed. The counterface ball before cleaning shows a significant polymer transfer typical of UHMWPE. However, after cleaning the ball with acetone, no visible scar mark is seen on the ball confirming no metal-to-metal contact due to the non-failure of the UHMWPE coating.

Figure 7F:
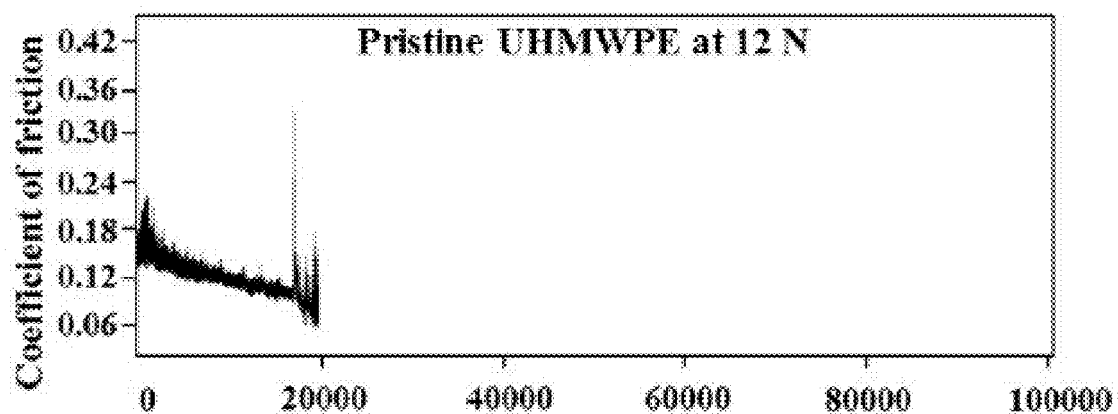
FIG. 7F shows a frictional graph produced by subjecting pristine UHMWPE with a 12 N sliding load and a sliding speed of 0.1 m/s for 100,000 cycles.
Figure 7G:
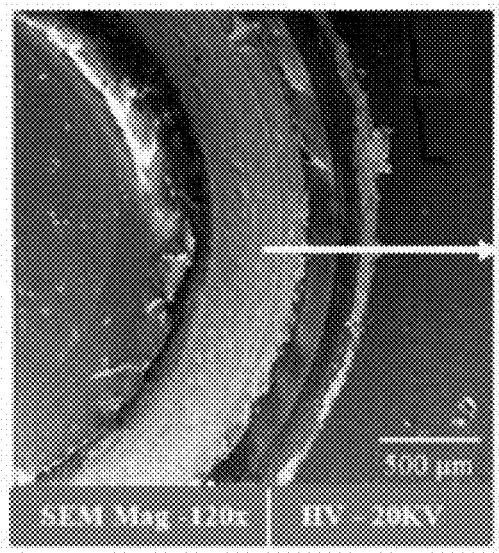
FIG. 7G is an FESEM image of the corresponding wear track for FIG. 7F
Figure 7H:
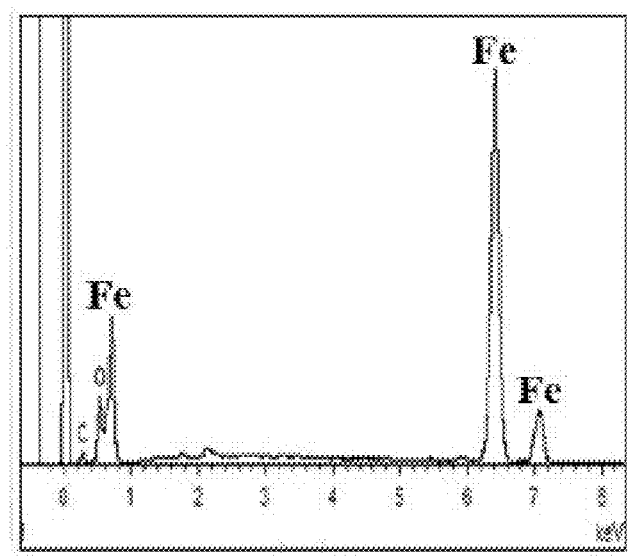
FIG. 7H is an EDS spectrum of the wear track in FIG. 7G.
Figure 7I:
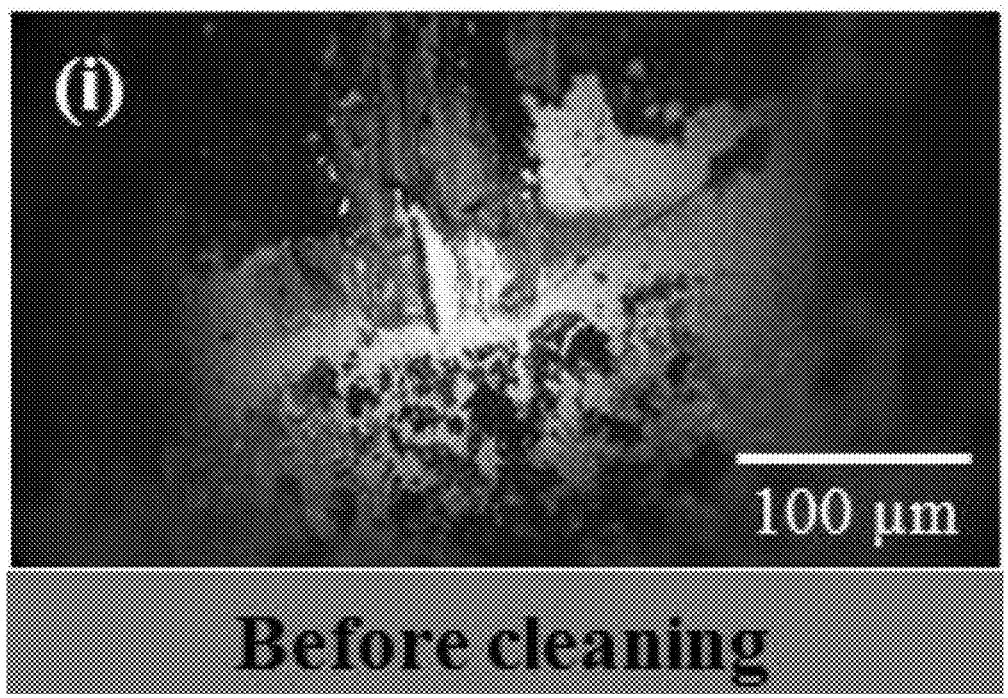
FIG. 7I is an image of the counterface ball used in FIG. 7F, before cleaning.
Figure 7J:
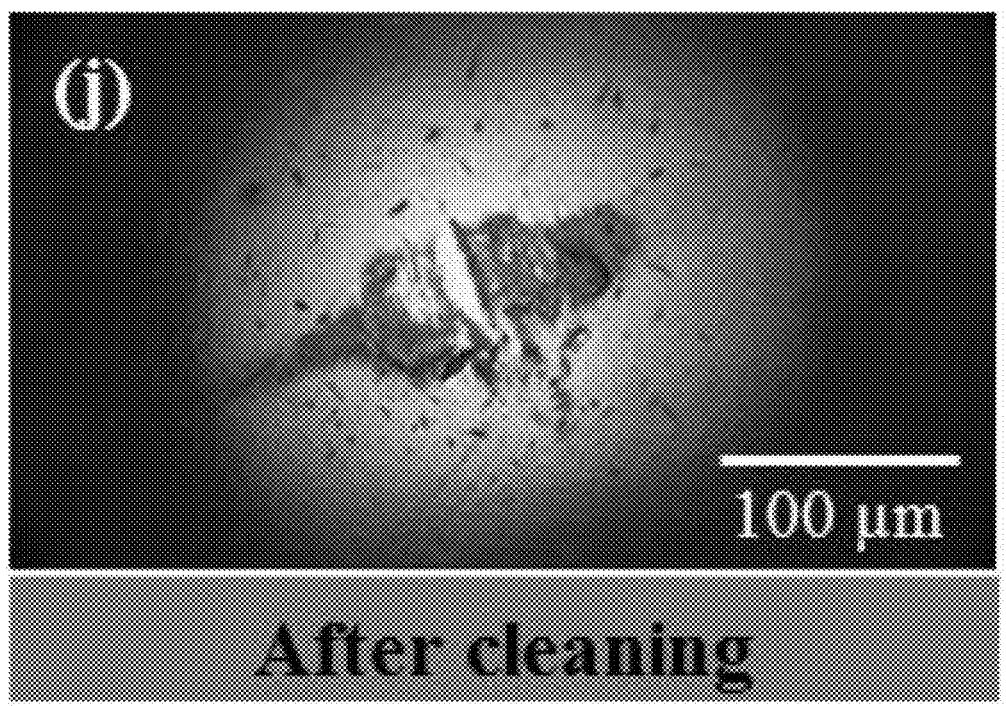
FIG. 7J is an image of the counterface ball used in FIG. 7F, after cleaning.
Figure 9A:
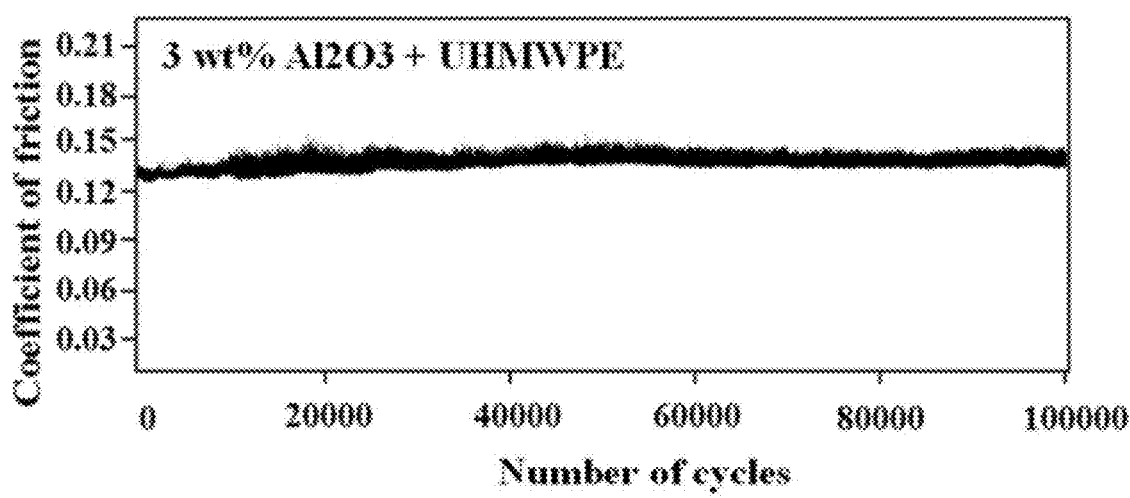
FIG. 9A is a frictional graph produced by subjecting a nanocomposite coating having 3 wt % alumina with a 12 N sliding load and a sliding speed of 0.1 m/s.
Figure 9B:
FIG. 9B is an image of the counterface ball used in FIG. 9A, before cleaning.
Figure 9C:
FIG. 9C is an image of the counterface ball used in FIG. 9A, after cleaning.
Figure 9D:
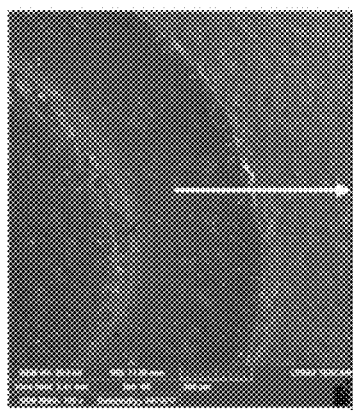
FIG. 9D is an FESEM image of the wear track produced from FIG. 9A.
Figure 9E:
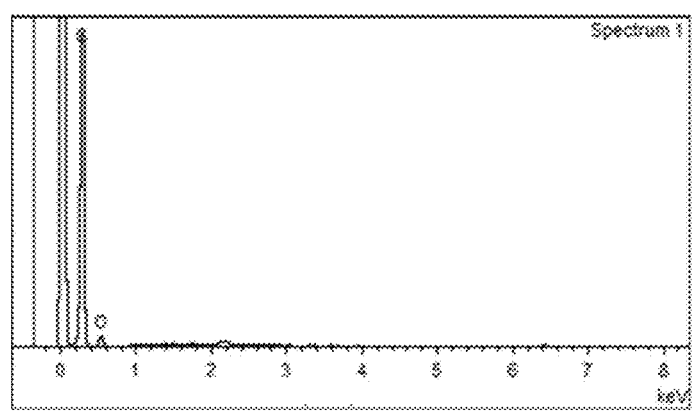
FIG. 9E is an EDS spectrum of the wear track in FIG. 9D.
Figure 10A:
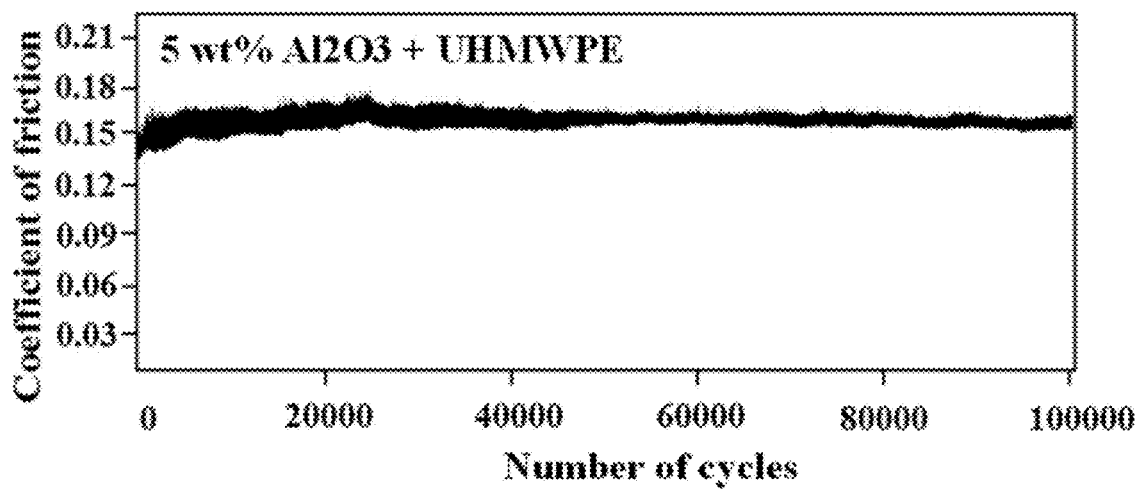
FIG. 10A is a frictional graph produced by subjecting a nanocomposite coating having 5 wt % alumina with a 12 N sliding load and a sliding speed of 0.1 m/s.
Figure 10B:
FIG. 10B is an image of the counterface ball used in FIG. 10A, before cleaning.
Figure 10C:
FIG. 10C is an image of the counterface ball used in FIG. 10A, after cleaning.
Figure 10D:
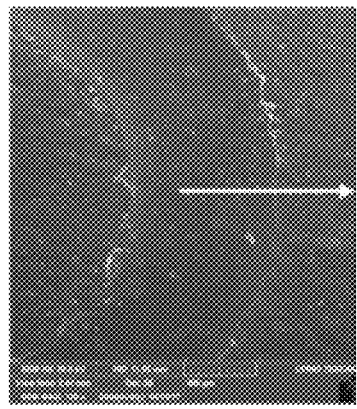
FIG. 10D is an FESEM image of the wear track produced from FIG. 10A.
Figure 10E:
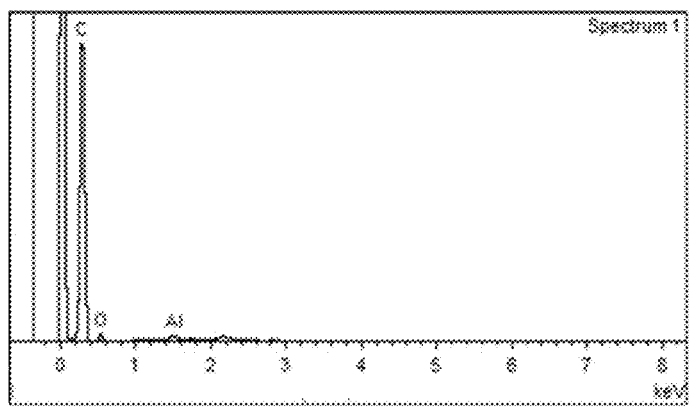
FIG. 10E is an EDS spectrum of the wear track in FIG. 10D.
Figure 12A:
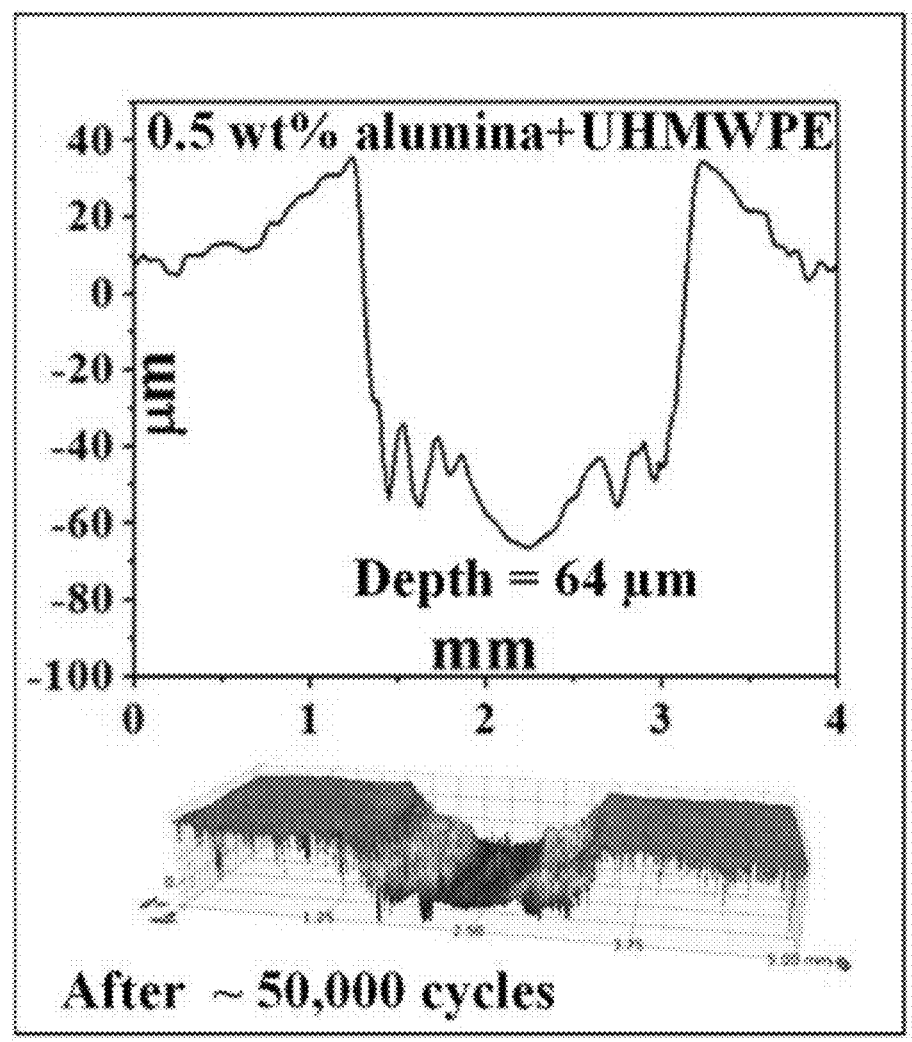
FIG. 12A shows the 2D and 3D profiles of a wear track produced by subjecting a 0.5 wt % alumina nanocomposite coating to a sliding wear test with a normal load of 12 N and a sliding speed of 0.1 m/s.
Figure 12B:
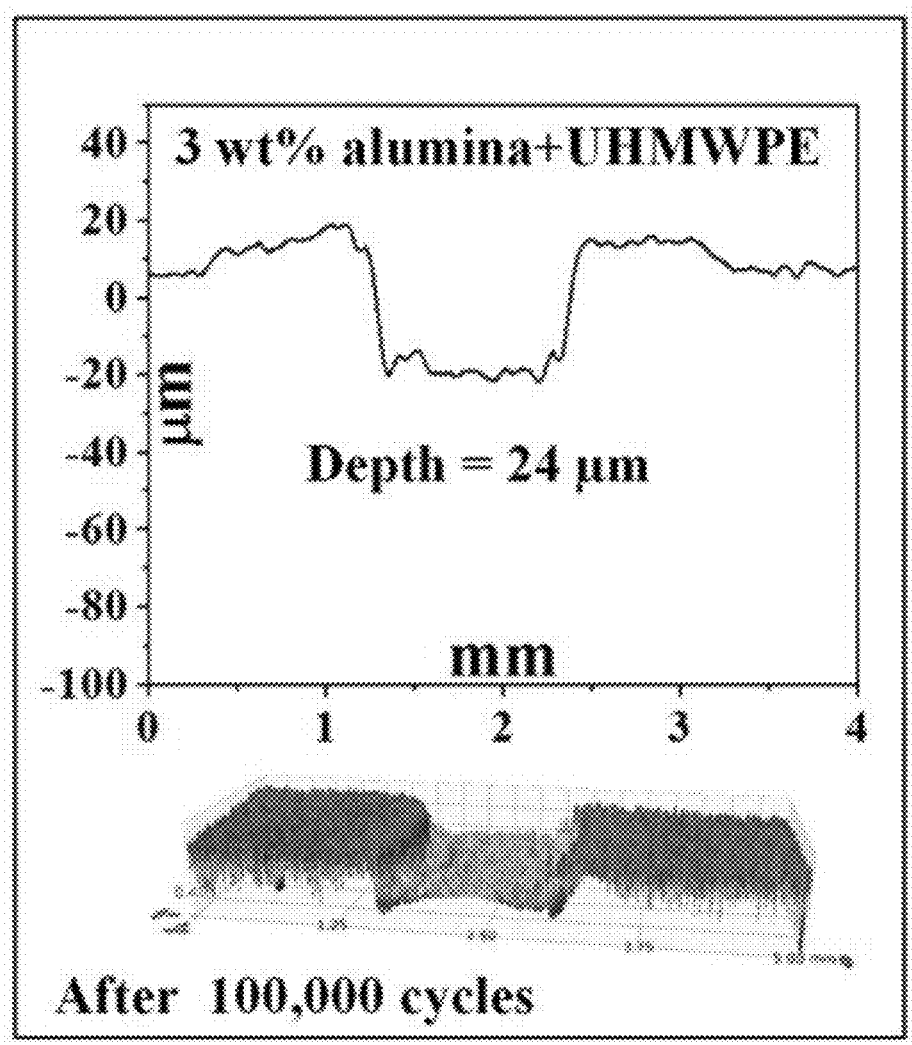
FIG. 12B shows the 2D and 3D profiles of a wear track produced by subjecting a 3 wt % alumina nanocomposite coating to a sliding wear test with a normal load of 12 N and a sliding speed of 0.1 m/s.
Figure 12C:
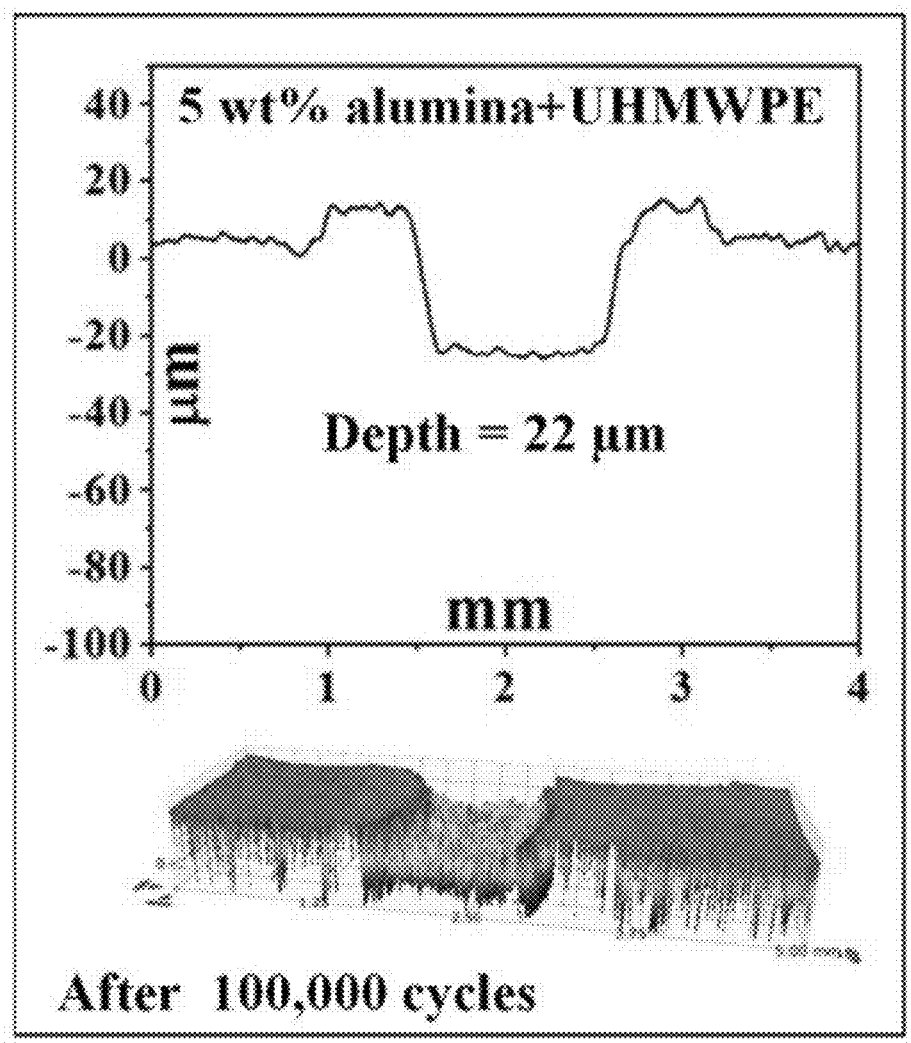
FIG. 12C shows the 2D and 3D profiles of a wear track produced by subjecting a 5 wt % alumina nanocomposite coating to a sliding wear test with a normal load of 12 N and a sliding speed of 0.1 m/s.
Figure 12D:
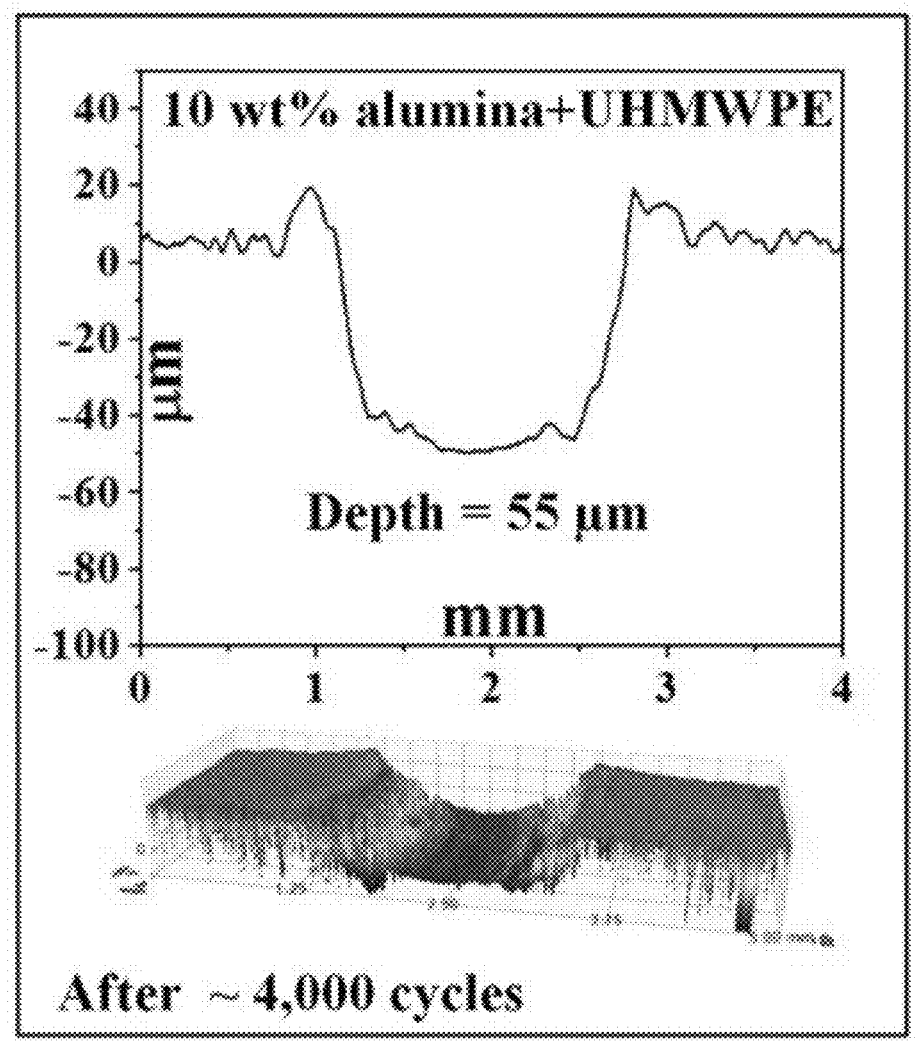
FIG. 12D shows the 2D and 3D profiles of a wear track produced by subjecting a 10 wt % alumina nanocomposite coating to a sliding wear test with a normal load of 12 N and a sliding speed of 0.1 m/s.
Figure 14A:
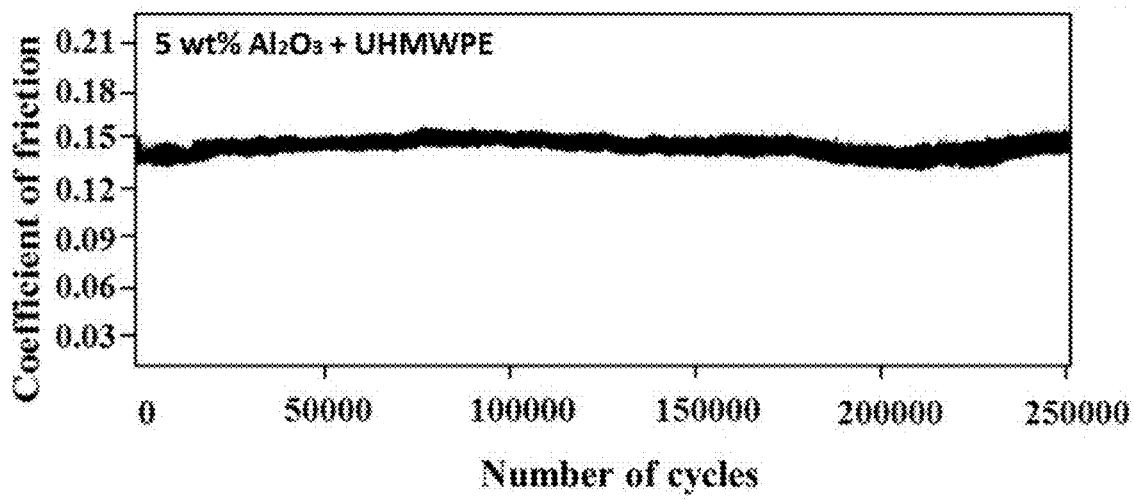
FIG. 14A shows a frictional graph produced by subjecting a nanocomposite coating having 5 wt % alumina with a 12 N sliding load for 250,000 cycles at a sliding speed of 0.1 m/s.
Figure 14B:
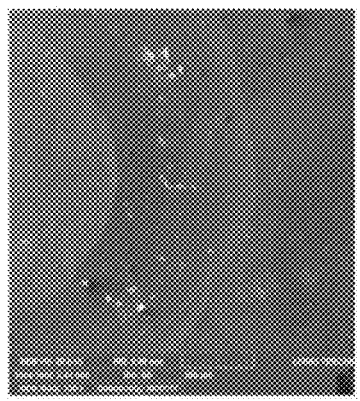
FIG. 14B shows an FESEM image of the corresponding wear track produced by the frictional graph in FIG. 14A.
Figure 14C:
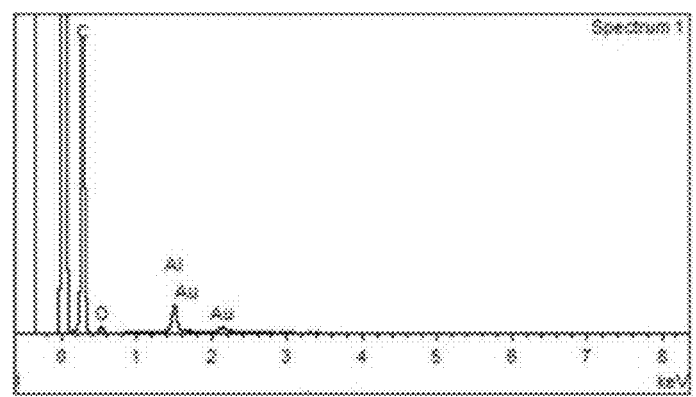
FIG. 14C shows an EDS spectrum of the wear track in FIG. 14B.

However, as the normal load was increased to 12 N, we could observe that the UHMWPE coating failed. This is confirmed from the frictional graph, which shows a sudden increase in the COF (FIG. 7F), and also by the FESEM image of the wear track as shown in FIG. 7G. The wear track is characterized by a considerable amount of polymer pullout, resulting in a thick transfer film on the counterface ball (FIG. 7I), suggesting of adhesive wear. Moreover, a considerable amount of plowing (deep grooves) is also observed on the wear track indicating a significant amount of abrasive wear during sliding. The failure of the coating is also confirmed by the display of the iron (Fe) peak, corresponding to the bare steel substrate in the EDS spectrum (FIG. 7H). Moreover, the counterface ball image after cleaning (FIG. 7J) also shows a big scar mark, suggestive of the coating failure leading to metal-to-metal contact during sliding. Based upon the evidence presented above, it can be concluded that the pristine UHMWPE coating failed at a normal load of 12 N, due to a combination of adhesive and abrasive wear mechanisms.

Tribological Performance of the UHMWPE Nanocomposite Coatings with Different Loadings of Alumina To increase the load-bearing capacity of the pristine UHMWPE coating, different loadings (0.5, 3, 5, and 10 wt %) of alumina nanoparticles were added to develop UHMWPE nanocomposite coatings. Since the pristine UHMWPE coating failed at 12 N, the evaluation of the nanocomposite coatings was started at a normal load of 12 N to check for the best concentration (wt %) of alumina which will result in the non-failure of the coating. Hence, sliding wear tests were conducted at a load of 12 N and a linear speed of 0.1 m/s for a sliding distance of 1.25 km (100,000 cycles). FIGS. 8A-8E, 9A-9E, 10A-10E, and 11A-11E show the typical frictional graphs, FESEM images of the wear track, EDS spectrum conducted on the wear track, counterface ball images before and after cleaning, for the nanocomposite coatings with different loadings of alumina. FIGS. 12A-12D show the 2D and 3D profiles of the wear track after the wear test.

As can be seen from FIGS. 8A-8E, 9A-9E, 10A-10E, 11A-11E, and 12A-12D, the UHMWPE nanocomposite coating reinforced with 0.5 wt % of alumina failed after about 50,000 cycles of sliding. The failure of the coating is confirmed by the presence of a Fe peak in the EDS analysis spectrum conducted on the wear track. Moreover, the optical images of the counterface ball recorded after the test also show a big scar, suggesting metal-to-metal contact. In spite of the uniform distribution of the alumina nanoparticles in the polymer matrix without the formation of agglomerates, as indicated earlier by the FESEM/EDS mapping analysis, the 0.5 wt % nanocomposite coating failed at a load of 12 N. This failure of the coating can be attributed to the insufficient amount of the nanofiller (alumina) in the polymer matrix, leading to significant polymer pullout, causing the failure of the coating.

However, the nanocomposite coatings reinforced with 3 wt % and 5 wt % of alumina did not fail even until 100,000 cycles of sliding at a load of 12 N, as evident from the frictional graphs, FESEM/EDS analysis (absence of Fe peak), and the absence of any scar mark on the counterface ball. This excellent performance of the nanocomposite coatings with 3 and 5 wt % of alumina can be attributed to the sufficient amount of the nanofillers and their uniform dispersion without any agglomerates, which helps in improved bonding between the nanoparticles and the polymer macromolecules, thus resisting any polymer pullout and leading to a significant improvement in their wear resistance. It should be noted that, even though both the nanocomposite coatings did not fail even until 100,000 cycles, a slight increase in the COF from 0.13 to 0.15 was observed in the case of sliding against the nanocomposite coating with 5 wt % of alumina.

As the amount of alumina increased to 10 wt %, the UHMWPE nanocomposite coating showed an early failure (4000 cycles) as can be seen from the frictional graph and confirmed by the FESEM/EDS analysis (presence of the Fe peak), and by the presence of a scar mark on the counterface ball after cleaning, suggesting metal-to-metal contact. This can also be confirmed from the 2D profile of the wear track as shown in FIGS. 12A-12D, whereby the depth of the wear track reached ~55 μm, which is greater than the thickness of the coating. The early failure of the 10 wt % alumina nanocomposite coating can be attributed to the non-uniform dispersion of the nanofillers with the formation of agglomerates as suggested by the FESEM/EDS mapping analysis.

The presence of agglomerates results in the formation of a two-phase system in the coating, namely, soft phase, where there is very little nanofiller and a hard phase, wherein most of the nanofillers have agglomerated. Thus, this results in the easy removal of the polymer due to the inefficient bonding between the polymer macromolecules and the nanofillers.

Evaluation of Tribological Performance of the 3 and 5 wt % Alumina Reinforced UHMWPE Nanocomposite Coating for Increased Number of Cycles To ascertain the tribological performance of the two nanocomposite coatings reinforced with 3 and 5 wt % after their excellent performance at a normal load of 12 N and at a linear speed of 0.1 m/s for a duration of 100,000 cycles, we decided to run long-term wear tests on these two nanocomposite coatings for an increased number of cycles of 250,000. FIGS. 13A-13C and 14A-14C show the typical frictional graphs, along with the FESEM/EDS spectrums on the wear tracks after 250,000 cycles at a load of 12 N. It can be clearly observed that both the coatings did not fail, even until 250,000 cycles, showing excellent wear resistance. The non-failure of the coatings can be confirmed by the absence of the Fe peak in the FESEM/EDS spectrum on the wear track after the wear tests. Moreover, the FESEM image shows a very smooth wear track, suggesting only mild wear due to plastic deformation of the polymer. The specific wear rates of the coatings for each of the compositions of 3 wt % and 5 wt % were calculated to be $1.98 \times 10^{-5}$ and $1.63 \times 10^{-5}$ mm$^3$/N·m, respectively.

Evaluation of Tribological Performance of the 3 and 5 wt % Alumina Reinforced UHMWPE Nanocomposite Coating at Increased Normal Load The 3 and 5 wt % alumina-reinforced UHMWPE nanocomposite coatings were further tested at a higher load of 15 N to check if they could sustain it. FIGS. 15A-15C and 16A-16C show typical frictional graphs and FESEM/EDS spectrums for both the coatings after a sliding wear test conducted at an increased normal load of 15 N and at a sliding speed of 0.1 m/s. It can be observed that both the nanocomposite coatings failed earlier than 100,000 cycles. The 3 wt % alumina-reinforced UHMWPE nanocomposite coating showed a wear life of approximately 50,000 cycles, and the 5 wt % alumina-reinforced UHMWPE nanocomposite coating showed a wear life of approximately 55,000 cycles at a normal load of 15 N.

In this study, UHMWPE nanocomposite coatings reinforced with different loadings (0.5, 3, 5, and 10 wt %) of alumina were developed and deposited on steel substrates to evaluate their tribological performance.

The results showed that the microhardness of the nanocomposite coatings increased with increasing content of alumina. However, large variations were observed in the hardness measurements on the UHMWPE nanocomposite coating reinforced with 10 wt % of alumina. This is attributed to the formation of two-phase system (soft and hard) in the coating, due to the agglomeration of the alumina nanoparticles.

In general, all the nanocomposite coatings showed better wear resistance as compared to the pristine UHMWPE coating at a load of 12 N. However, among them, nanocomposite coatings with 3 and 5 wt % exhibited the highest wear resistance as they did not fail even until 250,000 cycles at a load of 12 N. This is attributed to the superior mechanical properties of alumina, and its uniform dispersion in the polymer matrix.

However, both the 3 and 5 wt % alumina nanocomposite coatings failed at an increased load of 15 N, suggesting that both the coatings cannot withstand such a high load. The predominant modes of failure mechanisms of the coatings were found to be a combination of severe adhesive and abrasive wear, and in case of the coatings with no failure, the wear mechanism was found to be simple plastic deformation.

The invention claimed is:

1. A method for forming a nanocomposite coating on a substrate, comprising:
    mixing polyethylene microparticles with alumina nanoparticles in an organic solvent to form a precursor mixture;
    heating the precursor mixture at a temperature in a range of 75-95° C. for 18-30 h to produce a nanocomposite powder;
    applying the nanocomposite powder to the substrate heated at a temperature in a range of 160-200° C. to form the nanocomposite coating,
    wherein the nanocomposite coating consists of alumina nanoparticles dispersed within a polymeric matrix,
    wherein forming the nanocomposite coating does not include silanizing, and the nanocomposite coating does not comprise any silanes, and
    wherein the nanocomposite coating comprises 7.5 wt % to 12 wt % alumina relative to a total weight of the nanocomposite coating.

2. The method of claim 1, further comprising sonicating the alumina nanoparticles in the organic solvent prior to the heating.

3. The method of claim 1, wherein the polyethylene microparticles have a mean diameter in a range of 20-120 μm.

4. The method of claim 1, wherein the polyethylene microparticles consist essentially of UHMWPE.

5. The method of claim 1, wherein the dispersed alumina present in the coating comprises alumina nanoparticles having an average diameter in a range of 5-100 nm.

6. The method of claim 5, wherein the dispersed alumina present in the coating comprises alumina nanoparticles having an average diameter in a range of 8-20 nm.

7. The method of claim 1, wherein the applying includes electrostatically spraying the nanocomposite powder onto the substrate.

8. The method of claim 1, further comprising heating the substrate at the temperature in a range of 160-200° C. for a period of 15-60 min immediately following the applying.

9. The method of claim 1, wherein the substrate comprises steel.

10. The method of claim 9, wherein the substrate has a thickness in a range of 1-20 mm.

11. The method of claim 1, further comprising cleaning the substrate by plasma treatment before the applying.

12. The method of claim 1, wherein the nanocomposite coating has an average thickness in a range of 30-100 μm on the substrate.

13. The method of claim 1, wherein the nanocomposite coating has a Vickers hardness in a range of 10.5-12.5 HV.

14. The method of claim 1, wherein the substrate has a profile roughness parameter arithmetic average, $R_a$, in a range of 0.20-0.45 μm.

15. The method of claim 1, wherein the nanocomposite coating has a wear resistance against a sliding normal load of 8-20 N, wherein the wear resistance is 3-6 times a wear resistance of a substantially similar polyethylene coating that does not comprise alumina nanoparticles.

16. The method of claim 15, wherein the sliding normal load is a stainless steel ball having a diameter in a range of 5-10 mm.

17. The method of claim 1, further comprising:
sonicating the alumina nanoparticles in the organic solvent for 5-20 minutes prior to the mixing;
wherein the mixing is by magnetic stirring at 1,000 rpm for 1 hour; and
cleaning the substrate by plasma treatment before the applying;
wherein the applying includes electrostatically spraying the nanocomposite powder onto the substrate,
wherein the substrate comprises a steel having a thickness in a range of 1-20 mm,
wherein the nanocomposite coating has an average thickness in a range of 30-100 μm on the substrate, has a Vickers hardness in a range of 10.5-12.5 HV, has a profile roughness parameter arithmetic average, Ra, in a range of 0.20-0.45 μm, has a wear resistance against a sliding normal load of 8-20 N, wherein the wear resistance is 3-6 times a wear resistance of a substantially similar polyethylene coating that does not comprise alumina nanoparticles, and wherein the sliding normal load is a stainless steel ball having a diameter in a range of 5-10 mm.

\* \* \* \* \*